(12) United States Patent
Ruddell

(10) Patent No.: US 12,134,530 B2
(45) Date of Patent: Nov. 5, 2024

(54) ROLLING OBJECT DELIVERY SYSTEM, DEVICE, AND METHOD FOR LEVITATION

(71) Applicant: Industrial Control Software Inc., Lindsay (CA)

(72) Inventor: Terry Ruddell, Lindsay (CA)

( * ) Notice: Subject to any disclaimer, the term of this patent is extended or adjusted under 35 U.S.C. 154(b) by 0 days.

(21) Appl. No.: 17/742,737

(22) Filed: May 12, 2022

(65) Prior Publication Data
US 2022/0371835 A1 Nov. 24, 2022

Related U.S. Application Data

(60) Provisional application No. 63/190,372, filed on May 19, 2021.

(51) Int. Cl.
*A63B 69/00* (2006.01)
*B65G 51/03* (2006.01)

(52) U.S. Cl.
CPC .................. *B65G 51/03* (2013.01)

(58) Field of Classification Search
CPC ............................................ A63B 2069/0077
USPC ......................................................... 473/418
See application file for complete search history.

(56) References Cited

U.S. PATENT DOCUMENTS

| | | | | |
|---|---|---|---|---|
| 1,481,105 A * | 1/1924 | Levy | ...................... | A63F 7/0608 |
| | | | | 273/129 R |
| 2,705,003 A * | 3/1955 | Schensted | ............ | A63B 69/407 |
| | | | | 124/16 |
| 3,332,724 A * | 7/1967 | Doucet | ................... | B65G 47/24 |
| | | | | 198/406 |
| 3,887,182 A * | 6/1975 | Breslow | .................. | A63F 7/066 |
| | | | | 446/179 |
| 3,999,753 A * | 12/1976 | Desilets | ............. | A63B 69/0075 |
| | | | | 473/418 |
| 4,045,906 A * | 9/1977 | Goldfarb | ................... | A63F 9/02 |
| | | | | 446/179 |
| 4,564,195 A * | 1/1986 | McClure | ............ | A63B 69/0075 |
| | | | | 473/418 |
| 5,145,176 A * | 9/1992 | Lipson | ................... | A63B 57/10 |
| | | | | 473/135 |

(Continued)

FOREIGN PATENT DOCUMENTS

CN 1199351 A * 11/1998 ........... A63B 47/002
KR 20020086172 A * 11/2002

*Primary Examiner* — Joseph A Dillon, Jr.
(74) *Attorney, Agent, or Firm* — Heer Law; Christopher D. Heer

(57) ABSTRACT

A delivery system and method for levitation is disclosed. The delivery system includes an inlet trough; a queue aligned with the inlet trough; a blocker conduit aligned with the queue; a first blocker and a second blocker, each having an extension through the blocker conduit for selectively permitting passage through the blocker conduit, the extension of the first blocker spaced laterally along the blocker conduit from the extension of the second blocker; an exhaust conduit having an exhaust conduit receiver opening and an exhaust conduit exit opening, the exhaust conduit receiver opening aligned with a blocker conduit exit opening of the blocker conduit; and a force generator positioned near the base end and below the exhaust conduit receiver opening. A rolling object can exit through the exhaust conduit exit opening and levitate above the exhaust conduit exit opening. The delivery system can include a speed reducer.

20 Claims, 17 Drawing Sheets

(56) References Cited

U.S. PATENT DOCUMENTS

| | | | | |
|---|---|---|---|---|
| 5,160,131 A * | 11/1992 | Leon | A63B 69/409 | 124/56 |
| 5,257,615 A * | 11/1993 | Jones | A63B 47/02 | 124/56 |
| 5,294,109 A * | 3/1994 | Meade | A63B 69/40 | 124/50 |
| 5,330,175 A * | 7/1994 | Kim | A63B 24/0021 | 273/402 |
| 5,507,271 A * | 4/1996 | Actor | A63B 69/409 | 124/71 |
| 5,556,106 A * | 9/1996 | Jurcisin | A63B 63/00 | 273/395 |
| 5,603,664 A * | 2/1997 | Provost | A63B 57/0006 | 473/134 |
| 5,647,697 A * | 7/1997 | Gigante | B65G 51/02 | 406/79 |
| 5,733,209 A * | 3/1998 | McIntyre, IV | A63B 69/409 | 473/133 |
| 6,250,852 B1 * | 6/2001 | Kai | H01L 21/67784 | 406/137 |
| 6,443,859 B1 * | 9/2002 | Markin | A63B 69/406 | 124/78 |
| 6,461,087 B2 * | 10/2002 | Lin | G09F 19/12 | 406/106 |
| 6,666,776 B2 * | 12/2003 | Yamaguchi | A63B 47/002 | 473/134 |
| 6,840,715 B2 * | 1/2005 | Crovara Pescia | B65G 51/01 | 406/198 |
| 7,021,870 B2 * | 4/2006 | Gille | B65G 53/50 | 406/93 |
| 7,846,045 B1 * | 12/2010 | Kendall | A63B 69/0075 | 473/422 |
| 7,874,942 B2 * | 1/2011 | Auzoux | A63B 69/409 | 473/417 |
| 8,256,997 B2 * | 9/2012 | Brown | B65G 51/08 | 406/13 |
| 8,678,955 B2 * | 3/2014 | McKendrick | A63B 69/0075 | 473/418 |
| 8,734,061 B2 * | 5/2014 | Terzini | B65G 51/30 | 406/163 |
| 8,876,439 B2 * | 11/2014 | Sheehan | B01J 8/0015 | 198/534 |
| 9,033,828 B2 * | 5/2015 | LoDuca | A63B 69/0075 | 473/418 |
| 9,114,297 B1 * | 8/2015 | Saumell | A63B 47/002 | |
| 9,359,151 B2 * | 6/2016 | Hockett | B65G 47/684 | |
| 9,669,274 B1 * | 6/2017 | Renkis | A63B 57/10 | |
| 9,925,471 B2 * | 3/2018 | Flores | A63H 18/00 | |
| 10,093,492 B2 * | 10/2018 | Brewster | B65G 53/66 | |
| 2003/0203773 A1 * | 10/2003 | Leal | A63B 69/40 | 473/418 |
| 2007/0238554 A1 * | 10/2007 | Hu | A63B 69/0075 | 473/422 |
| 2008/0009373 A1 * | 1/2008 | Binder | A63B 69/409 | 473/418 |
| 2021/0170251 A1 * | 6/2021 | Wells | A63B 69/0075 | |
| 2021/0245038 A1 * | 8/2021 | Forgrave | A63F 7/28 | |

* cited by examiner

ROLLING OBJECT DELIVERY SYSTEM, DEVICE, AND METHOD FOR LEVITATION

FIELD

The present specification relates generally to delivery devices for rolling objects and, specifically, to a delivery system for suspending an object.

BACKGROUND

Ball delivery devices are observed in a variety of gaming applications. These include arcade games, table games, bingos and lotteries. For example, a ball delivery device may be used to put a ball into play within a pinball machine, or to deliver balls to serve as projectiles to the player of a target game. A ball delivery device may also be relied on, for example, to draw winning numbers in a lottery game or letter-number combinations in a game of bingo.

SUMMARY

According to an aspect, a delivery system for levitation is provided. A delivery system for levitation includes: an inlet trough having an inlet receiver opening and an inlet exit opening; a queue having a queue receiver opening aligned with the inlet exit opening; a blocker conduit having a blocker conduit receiver opening aligned with a queue exit opening of the queue; a first blocker and a second blocker, each having an extension through the blocker conduit for selectively permitting passage through the blocker conduit, the extension of the first blocker spaced laterally along the blocker conduit from the extension of the second blocker; an exhaust conduit having an exhaust conduit receiver opening between a base end of the exhaust conduit and an exhaust conduit exit opening of the exhaust conduit, the exhaust conduit receiver opening aligned with a blocker conduit exit opening of the blocker conduit; and a force generator positioned near the base end and below the exhaust conduit receiver opening.

According to an aspect, a delivery system for levitation is provided. The delivery system for levitation includes: an inlet trough having an inlet receiver opening and an inlet exit opening; a queue having a queue receiver opening aligned with the inlet exit opening; a blocker conduit having a blocker conduit receiver opening aligned with a queue exit opening of the queue; a first blocker and a second blocker, each having an extension extendable through the blocker conduit and retractable from the blocker conduit, the extension of the first blocker spaced laterally along the blocker conduit from the extension of the second blocker; an exhaust conduit having an exhaust conduit receiver opening between a base end of the exhaust conduit and an exhaust conduit exit opening of the exhaust conduit, the exhaust conduit receiver opening aligned with a blocker conduit exit opening of the blocker conduit; and a force generator positioned near the base end and below the exhaust conduit receiver opening. In some embodiments, the delivery system includes a speed reducer. The delivery system can suspend an object moving through the delivery system past the speed reducer. The suspension can be indefinite.

In some embodiments, the inlet trough is angled downwards.

In some embodiments, the inlet trough is comprised of a wire frame.

In some embodiments, the inlet trough is configured to allow debris to pass through transversely to an axis defined by the length of the inlet trough.

In some embodiments, the queue comprises an enclosed pipe.

In some embodiments, the queue comprises material that is not opaque.

In some embodiments, the queue is angled downwards.

In some embodiments, the queue receiver end is sized and dimensioned to receive no more than one rolling object simultaneously.

In some embodiments, the blocker conduit is comprised of a wire frame.

In some embodiments, the blocker conduit is configured to allow debris to pass through transversely to an axis defined by the length of the blocker conduit.

In some embodiments, the first blocker extends transversely through the blocker conduit.

In some embodiments, the second blocker extends transversely through the blocker conduit.

In some embodiments, the first blocker and the second blocker each extend transversely through the blocker conduit.

In some embodiments, the delivery system further includes a microprocessor configured to temporarily retract the extension of the first blocker to allow a rolling object in the blocker conduit to enter a space between the extension of the first blocker and the extension of the second blocker and be retained therebetween.

In some embodiments, the microprocessor is configured to temporarily retract the extension of the second blocker to allow the rolling object to exit the space between the extension of the first blocker and the extension of the second blocker.

In some embodiments, the distance between the extension of the first blocker and the extension of the second blocker is the diameter of each rolling object in the blocker conduit.

In some embodiments, the distance between the extension of the first blocker and the extension of the second blocker is configured to allow no more than one rolling object therebetween simultaneously.

In some embodiments, the force generator is configured to direct force through the exhaust conduit from the base end towards the exhaust conduit exit opening.

In some embodiments, the delivery system further includes a speed reducer attachable to the exhaust conduit near the exhaust conduit exit opening.

In some embodiments, the speed reducer extends through the exhaust conduit at a distance configured for frictional contact with a rolling object moving past the speed reducer through the exhaust conduit, the frictional contact reducing a speed of the rolling object to allow it to be supported by a force maintainable by the force generator above the exhaust conduit.

In some embodiments, the base end is an opening.

In some embodiments, the force generator further comprises a protective cover.

In accordance with an aspect, there is provided a system for delivering a levitating ball, including: the delivery system; a surface angled downwards towards the inlet trough and positioned near a rear wall; one or more receivers positioned on the surface and sized and dimensioned to receive at least one ball; and at least one of the one or more receivers having a post extending upwards therethrough near an interior surface of the receiver, the interior surface excluding a rear interior surface.

In some embodiments, the system further includes at least two receivers; and at least one rear post, each rear post positioned on the surface and extending upwards near the rear wall and between a space defined by the rear wall and adjacent receivers of the at least two receivers.

According to an aspect, there is provided a method for levitating a rolling object, including: retaining at least one rolling object; blowing a gas upwards to create an upwards force sufficient to levitate each rolling object separately; and separately levitating each rolling object using the force.

Other aspects and features according to the present application will become apparent to those ordinarily skilled in the art upon review of the following description of embodiments in conjunction with the accompanying figures.

BRIEF DESCRIPTION OF THE DRAWINGS

The principles of embodiments may better be understood with reference to the accompanying figures provided by way of illustration of an exemplary embodiment, or embodiments, incorporating principles and aspects, and in which.

DETAILED DESCRIPTION OF EMBODIMENTS

Figure 1:
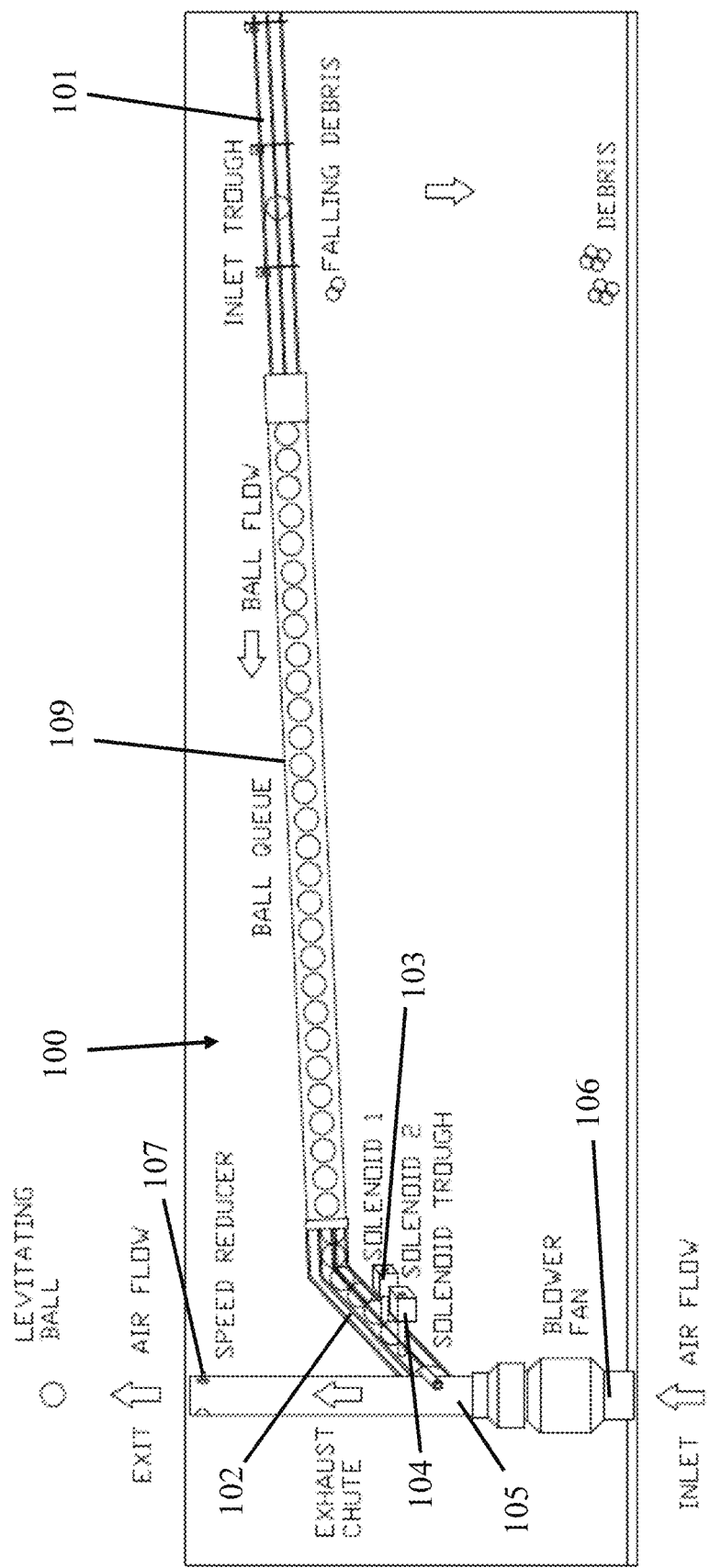
FIG. 1 is front plan view of a delivery system, according to an embodiment.

The description that follows, and the embodiments described therein, are provided by way of illustration of an example, or examples, of particular embodiments of the principles of various embodiments. These examples are provided for the purposes of explanation, and not of limitation, of those principles. In the description, like parts are marked throughout the specification and the drawings with the same respective reference numerals. The drawings are not necessarily to scale and in some instances proportions may have been exaggerated in order to more clearly depict certain features.

Ball delivery devices may be prone to jamming and may require human intervention to resume operation following an obstruction. Obstructions may not only inhibit the delivery of a ball but may damage or disrupt the proper functioning of multiple elements of the ball delivery device. Ball delivery devices may also be incapable of delivering a ball that can levitate, unsupported by a surface, without the ball falling to the ground shortly thereafter—that is, delivering and maintaining a ball in suspension.

In some embodiments, a delivery system 100 for levitation includes an inlet trough having an inlet receiver opening and an inlet exit opening; a queue having a queue receiver opening aligned with the inlet exit opening; a blocker conduit having a blocker conduit receiver opening aligned with a queue exit opening of the queue; a first blocker and a second blocker, each having an extension extendable through the blocker conduit and retractable from the blocker conduit, the extension of the first blocker spaced laterally along the blocker conduit from the extension of the second blocker; an exhaust conduit having an exhaust conduit receiver opening between a base end of the exhaust conduit and an exhaust conduit exit opening of the exhaust conduit, the exhaust conduit receiver opening aligned with a blocker conduit exit opening of the blocker conduit; and a force generator positioned near the base end and below the exhaust conduit receiver opening. The force generator can be a blower, for example. In some embodiments, the blower can be a blower fan that blows gas, such as air.

According to some embodiments, an example blocker 103 or 104 is a solenoid, an example blocker conduit 102 is a solenoid trough, an example force generator 106 is a blower fan, an example queue 109 is a ball queue, and an example exhaust conduit 105 is an exhaust chute.

Figure 14:
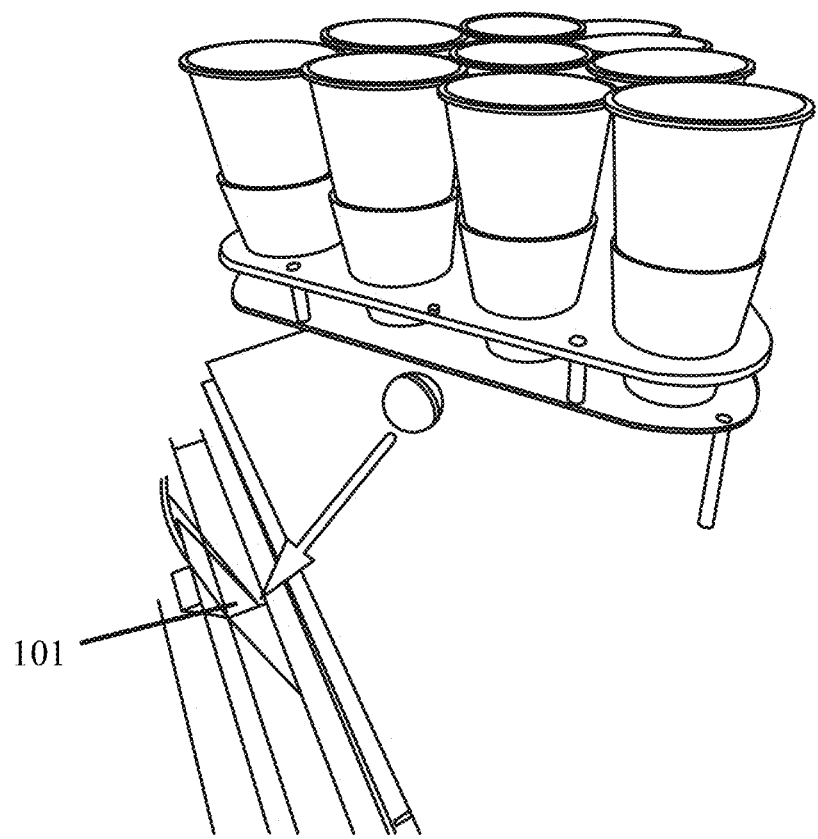
FIG. 14 is a perspective view of a game.
Figure 15:
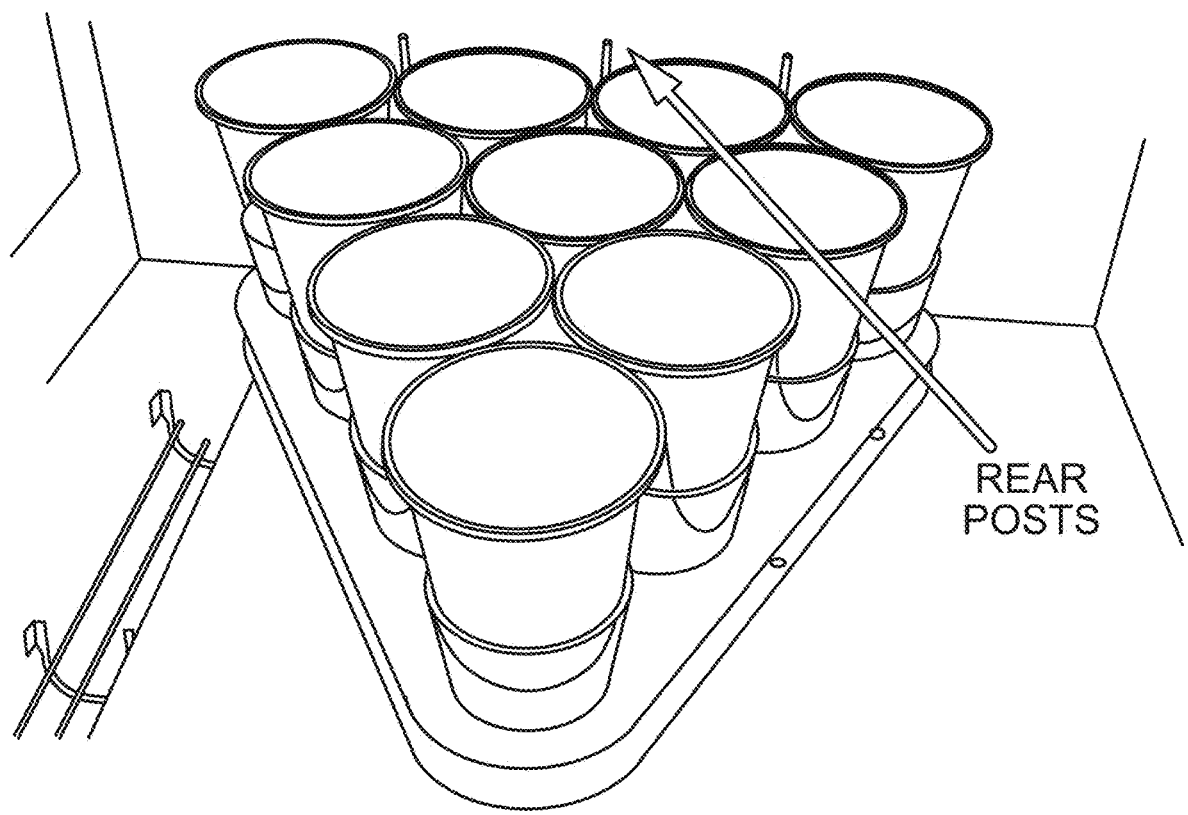
FIG. 15 is a perspective view of a game.
Figure 16:
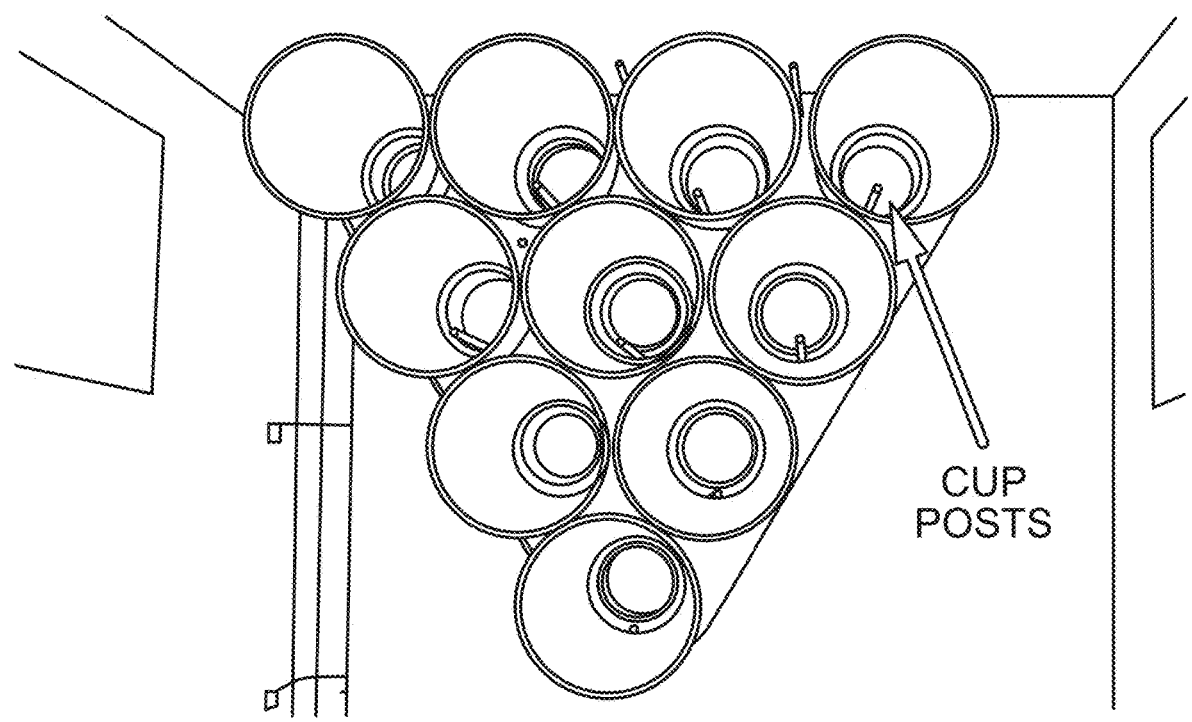
FIG. 16 is a top view of a game.
Figure 17:
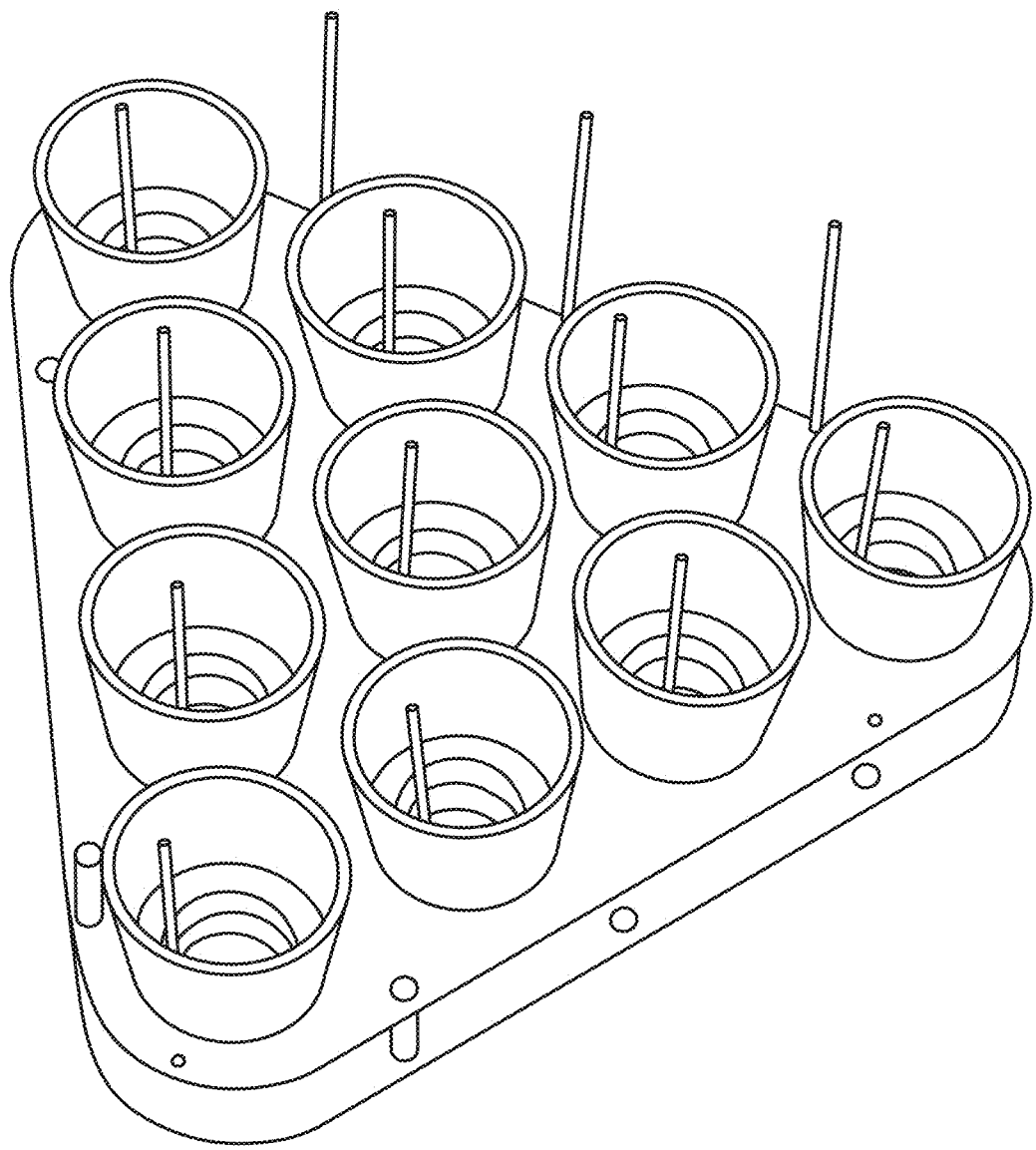
FIG. 17 is a perspective view of a game.
Figure 18:
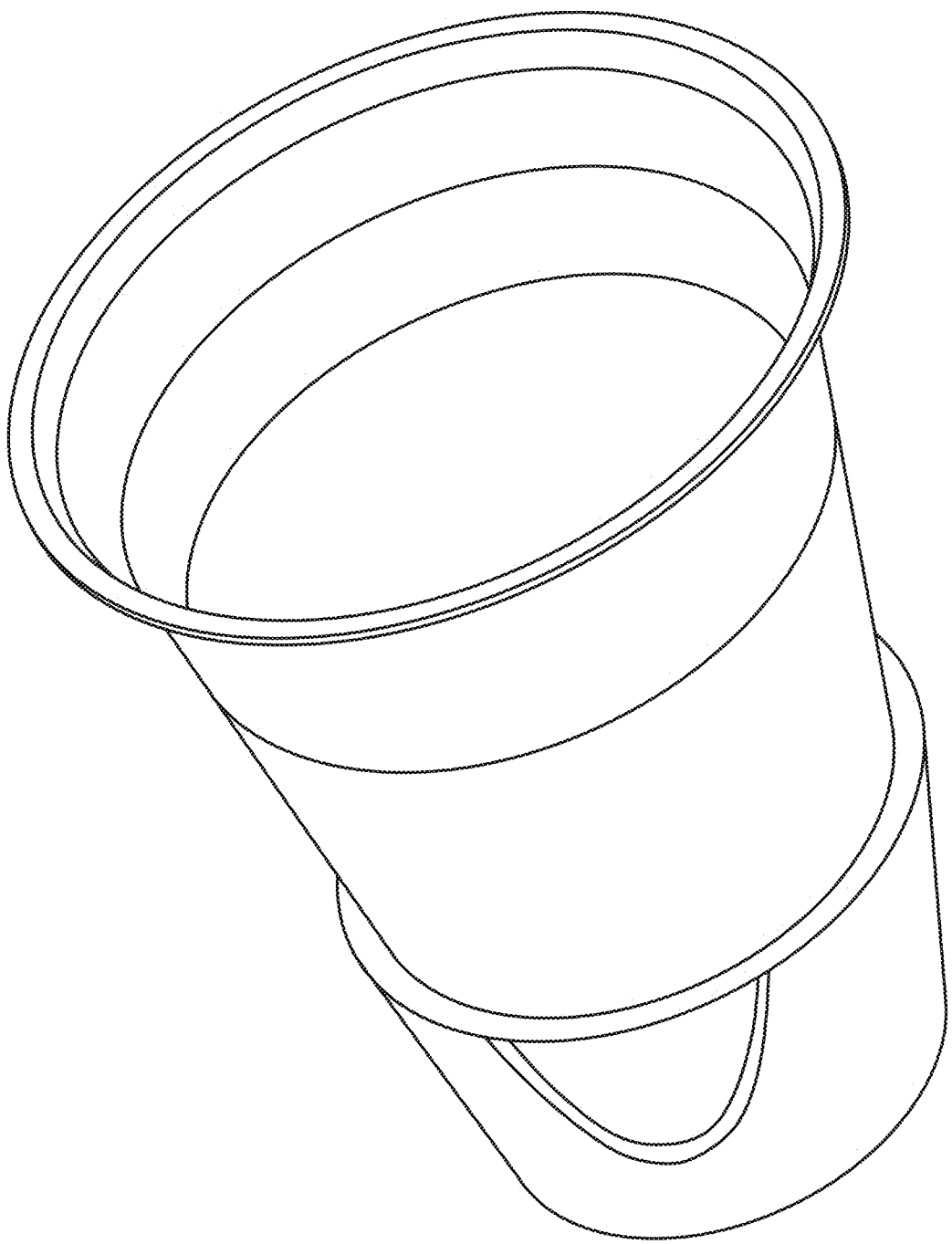
FIG. 18 is a perspective view of a game.

According to an embodiment as shown in FIGS. 2-11, a delivery system 100 is configured to automatically deliver and levitate (suspend) a rolling object from an inlet trough to a point in the air proximate an exhaust conduit 105. Examples of the rolling object include a ball, a coin, object that is not perfectly round, or other acceptable rolling object. Accordingly, delivery system 100 may be used, for example, in arcade games, table games, bingos, lottery and other applications to put rolling objects into play and draw winning numbers, respectively. A rolling object can be thrown into a bottomless cup, pipe, can, box, etc. and the rolling object can roll down an angled flat surface towards inlet trough 101, such as shown in FIG. 14. The flat surface is angled so that the rolling object can roll towards inlet trough 101.

Delivery system 100 includes a speed reducer 107. FIG. 1 shows an example speed reducer 107. Speed reducer 107 can comprise a screw extended a distance into exhaust conduit 105, for example. Speed reducer 107 reduces a rolling object's speed as it exits delivery system 100 such that the rolling object, propelled upward by force from a force generator 106 (e.g., a stream of air from a force generator 106), is suspended immediately above delivery system 100 upon exit. A rolling object suspended by delivery system 100 will remain suspended until a force generator is turned off or until the rolling object is acted upon by an outside force. The suspension of the rolling object may allow for touchless delivery and presentation of a rolling object in a lottery game, obviating concerns surrounding manipulation of results by human operators. The suspension of the rolling object may also extend a period during which the rolling object is available for play, in the case of arcade and table game applications, or available for review, in the case of lottery applications. Suspension of a rolling object by delivery system 100, as opposed to the rolling object being supported by a surface, may also increase a number of applications to which delivery system 100 may be put.

In some embodiments, speed reducer 107 comprises a solenoid, for example. This solenoid includes a plunger that is extendable into and retractable from exhaust conduit 105. In some embodiments, speed reducer 107 comprises a wheel (e.g., rubber) extended a distance into exhaust conduit 105 that allows contact with a rolling object passing through exhaust conduit 105 to slow the rolling object down. In some embodiments, speed reducer 107 comprises a different device that slows down a rolling object propelled by a force generated by force generator 106.

In some embodiments, delivery system 100 does not include speed reducer 107, but force generator 106 is configured to control the speed at which a rolling object propelled by a force generated by force generator 106 moves through exhaust conduit 105. In particular, in these embodiments, force generator 106 generates a force sufficient to propel the rolling object at a suitable speed (e.g., slow speed) through exhaust conduit 105 and then a suitable force (e.g., faster) to allow the rolling object to maintain levitation above exhaust conduit 105. For example, according to some embodiments, a blower configurable for speed adjustment can generate a force sufficient to propel a ball at a slow speed until the ball exits exhaust conduit 105 such that the ball is not propelled too quickly out of exhaust conduit 105, and once the ball exits exhaust conduit 105, the ball is suspended (e.g., floats) above exhaust conduit 105, and the blower can slowly ramp up the force generated to raise the ball higher in a suspended state above exhaust conduit 105. The speed adjustment of the blower can be actuated by a controller or electrical signal, for example.

Delivery system 100 may comprise an inlet trough 101 (which can be perforated or wire frame, for example), queue 109 and perforated or wireframe blocker conduit 102. The inlet trough 101 and blocker conduit 102 may facilitate the detection of obstructions of inlet trough 101 and blocker conduit 102 and troubleshooting in the event of dysfunction of delivery system 100, thereby reducing time spent on maintenance and repair. Further, the inlet trough 101 and blocker conduit 102 may prevent obstruction of delivery system 100 by small debris, which may fall through inlet trough 101 and blocker conduit 102 to a surface below. Debris can pass through transversely to an axis defined by the length of the inlet trough 101 and blocker conduit 102. Inlet trough 101, queue 109 and blocker conduit 102 can be any length depending on the application. The wireframe gaps on blocker conduit 102 are such that rolling objects cannot pass through the perimeter. This restricts anyone from removing a rolling object manually once it exits the inlet trough 101. For example, blocker conduit 102 can comprise an enclosure around the rolling object(s) contained in blocker conduit 102, and the enclosure can be a wireframe forming a 360 degree perimeter around rolling object(s) so contained. This can prevent rolling objects from being manually removed from blocker conduit 102 as the rolling objects cannot pass through this perimeter. The wireframe or other structure can surround each rolling object along a 360 degree perimeter, and debris can pass through the wireframe or other structure while each rolling object is contained within the perimeter. This can prevent rolling object(s) from leaving the blocker conduit if a person puts their hand on the exhaust conduit 105. Rolling objects can be prevented from escape back up into inlet trough 101 where queue 109 is full and/or the nature of the retaining frame of blocker conduit 102 can reduce and/or prevent force from force generator 106 from directing or propelling a rolling object from exhaust conduit 105 back through its exhaust conduit receiver opening to blocker conduit 102.

Inlet trough 101 can instead form a partial perimeter around rolling object(s) contained by inlet trough 101. One or more rolling objects can fall from a game component onto one or more locations along inlet trough 101 and be cradled by inlet trough 101. Inlet trough 101 can be a half pipe and allow debris to pass through inlet trough 101, while allowing rolling object(s) to fall onto a location along inlet trough 101 and be retained by inlet trough 101.

Delivery system 100 includes an exhaust conduit 105, connected to blocker conduit 102 at an exhaust conduit receiver opening and positioned near a force generator 106 such that force generator 106 is positioned near a base end of the exhaust conduit and below the exhaust conduit receiver opening. Force generator 106 sends force (e.g., generated by air) up exhaust conduit 105. For the size and weight of a ping-pong ball, a 12 VDC, 130 cubic feet per minute force generator can be used. Blocker conduit 102 feeds into exhaust conduit 105 at a point above force generator 106. In the event of obstruction of exhaust conduit 105, blocker conduit 102 can allow air from force generator 106 to dissipate such that insufficient force is available to propel one or more rolling objects backward through blocker conduit 102, queue 109 and inlet trough 101 thereto connected. As a result, once an obstruction of exhaust conduit 105 is removed, delivery system 100 can immediately and reliably deliver a rolling object trapped in the exhaust conduit or portion of blocker conduit between the exhaust conduit and the second blocker 104. Delivery system 100 may therefore provide an economical, low maintenance alternative to rolling object delivery devices. Delivery system 100 may also promote quick return to play with minimal human intervention in the event of obstruction, thereby increasing revenue and decreasing costs associated with delivery system 100 in gaming applications. A levitating rolling object also has appeal for motivating customers to play an arcade game or home table game more often.

Figure 19:
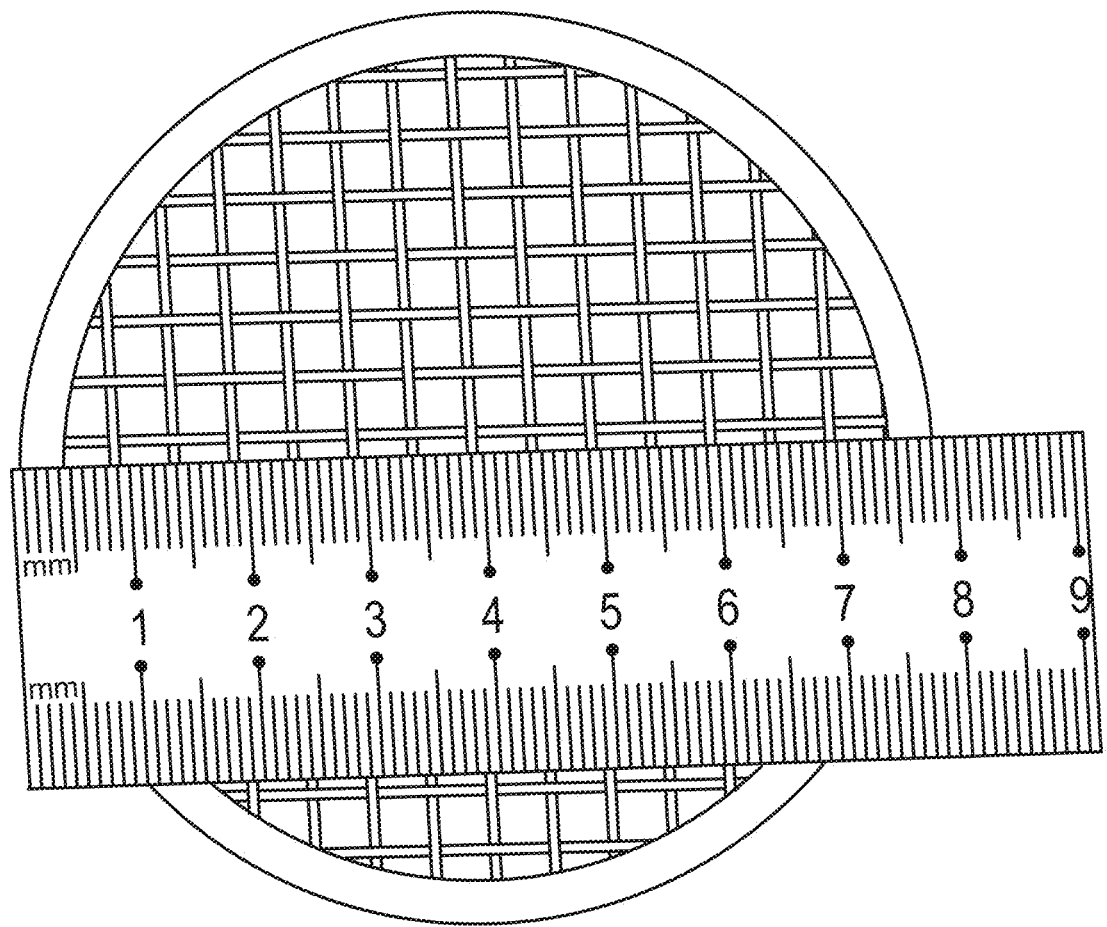
FIG. 19 is a top view of a protective cover.
Figure 20:
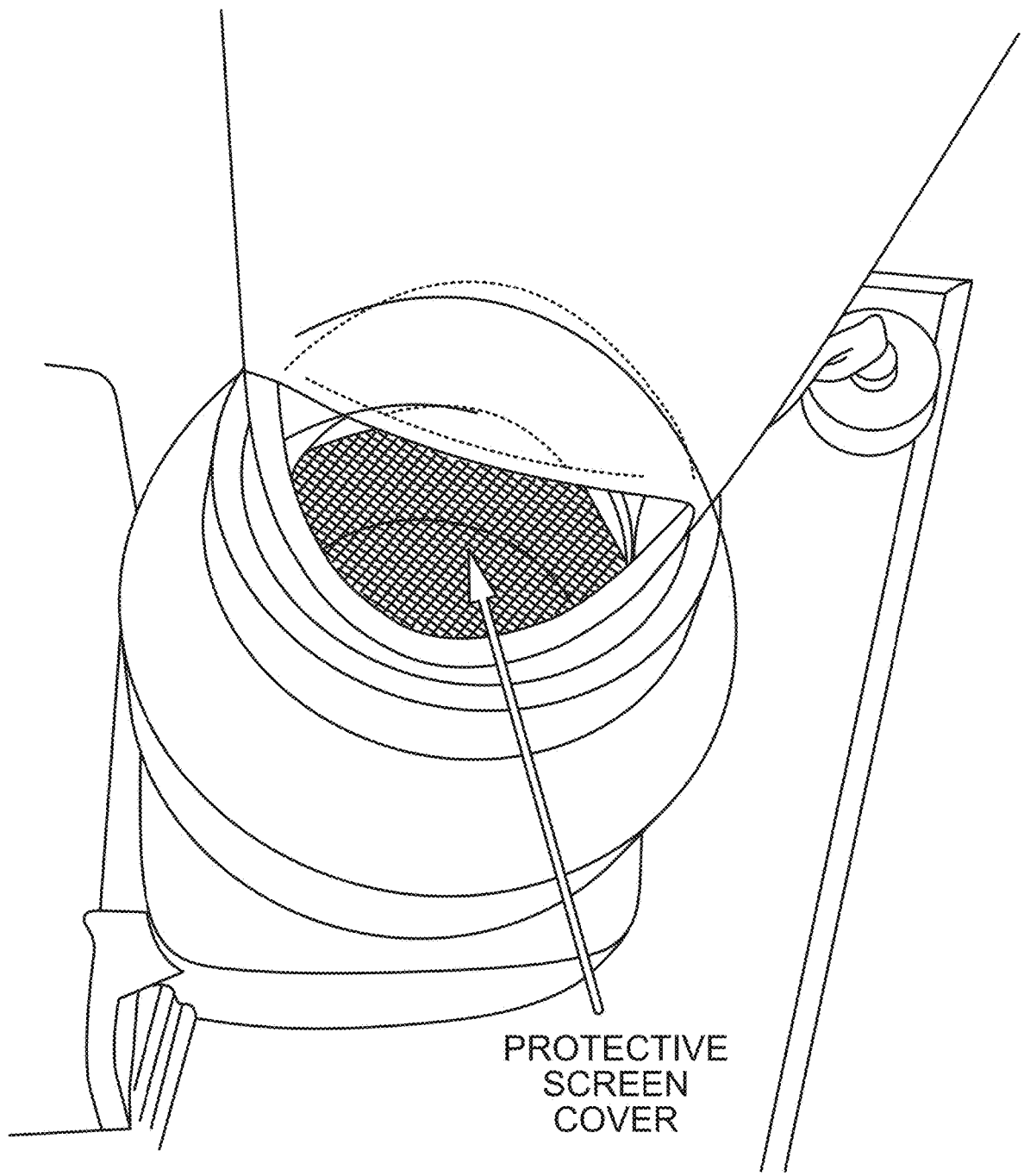
FIG. 20 is a perspective view of a protective cover.

Force generator 106 of delivery system 100 may include a top motor cover that can be plastic. The plastic motor cover may further contribute to the durability of delivery system 100 by protecting a motor within force generator 106 from spills and other debris which may occasionally enter exhaust conduit 105 and consequently force generator 106. Force generator 106 may also comprise an air inlet covered by a bottom motor cover, such as a wireframe grill or perforated cap. In the event of a spill affecting exhaust conduit 105, some of the spill may be blown up and out of force generator 106, while any remaining liquid passes through the air inlet, thereby exiting delivery system 100. In some embodiments, delivery system 100 includes a force generator cover that helps prevent objects dropped into a top opening of exhaust conduit 105 from reaching force generator 106. The force generator cover can be a grill such as shown in FIG. 19 or 20. This can prevent keys or a toy dropped down exhaust conduit 105 from damaging propellers of a blower fan embodiment of force generator 106, for example. In some embodiments, delivery system 100 includes a top motor cover that is a plastic cover that is waterproof that allows liquid to pass the motor without damaging same and through the bottom motor cover to reach the ground, For example.

According to an embodiment, force generator 106 is a sound wave emitter that emits sound waves to levitate a rolling object instead of air from force generator 106. Another force generator 106 can be used.

Delivery system 100 may be constructed from materials which provide sufficient mechanical strength and durability to perform reliably over time, withstand impact, and tolerate the occasional inadvertent introduction of foreign matter into delivery system 100, for example, fountain beverages or other consumables and personal belongings. According to an embodiment, delivery system 100 may be constructed of wood, aluminum, galvanized steel, thermoplastics, or a combination of suitable materials. Manufacturing costs, lifespan and mechanical strength may be considerations informing the choice of materials, construction technique and design choices of delivery system 100.

Figure 2:
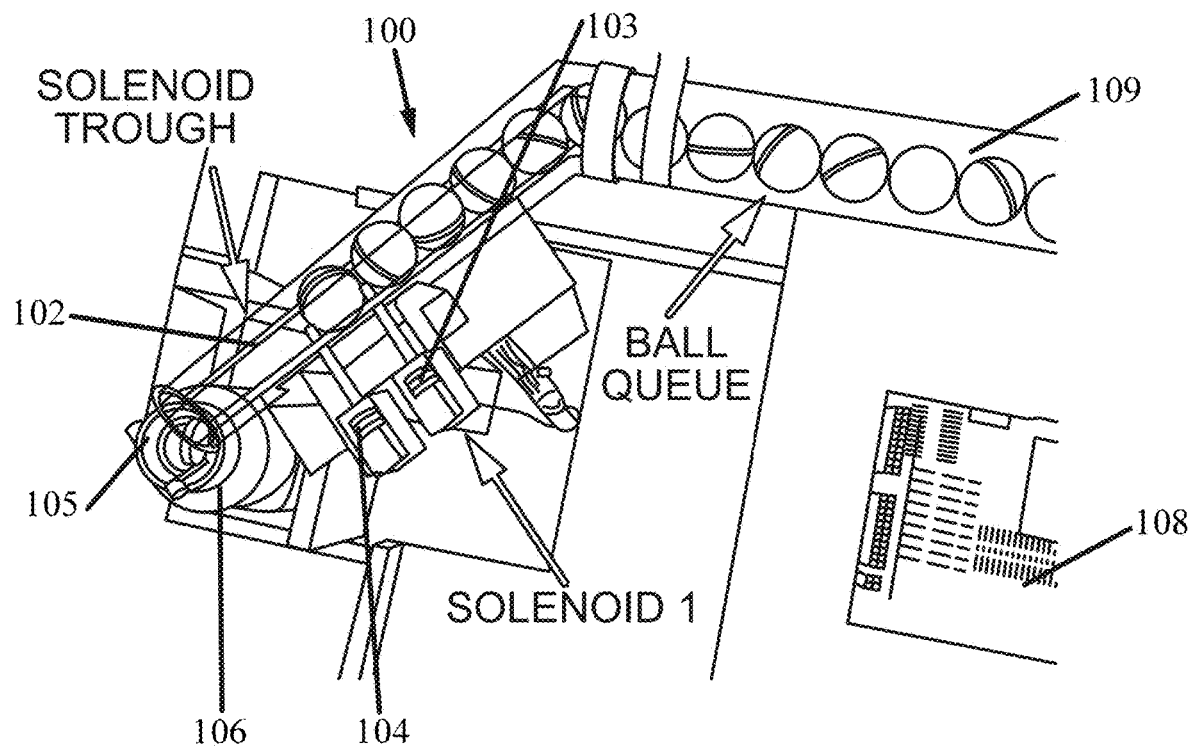
FIG. 2 is a top perspective view of a delivery system, according to an embodiment.
Figure 3:
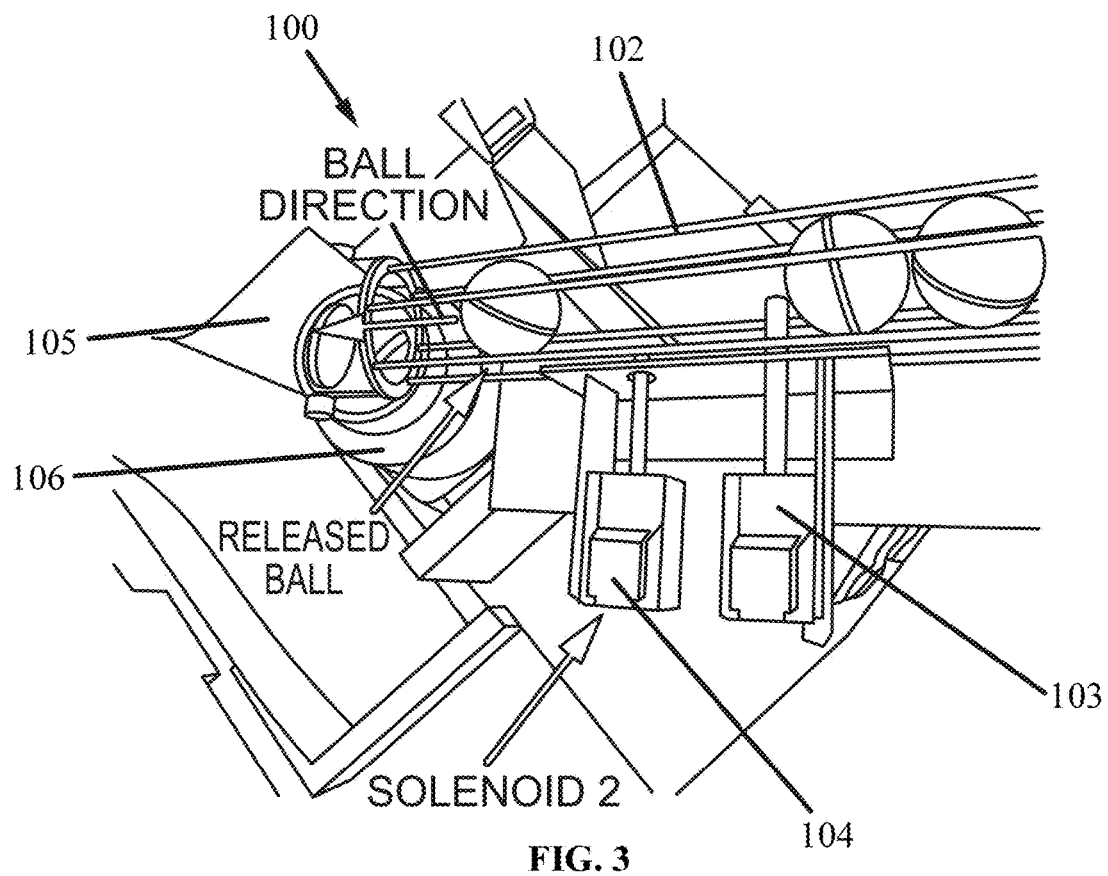
FIG. 3 is a top perspective view of the delivery system of FIG. 2.
Figure 4:
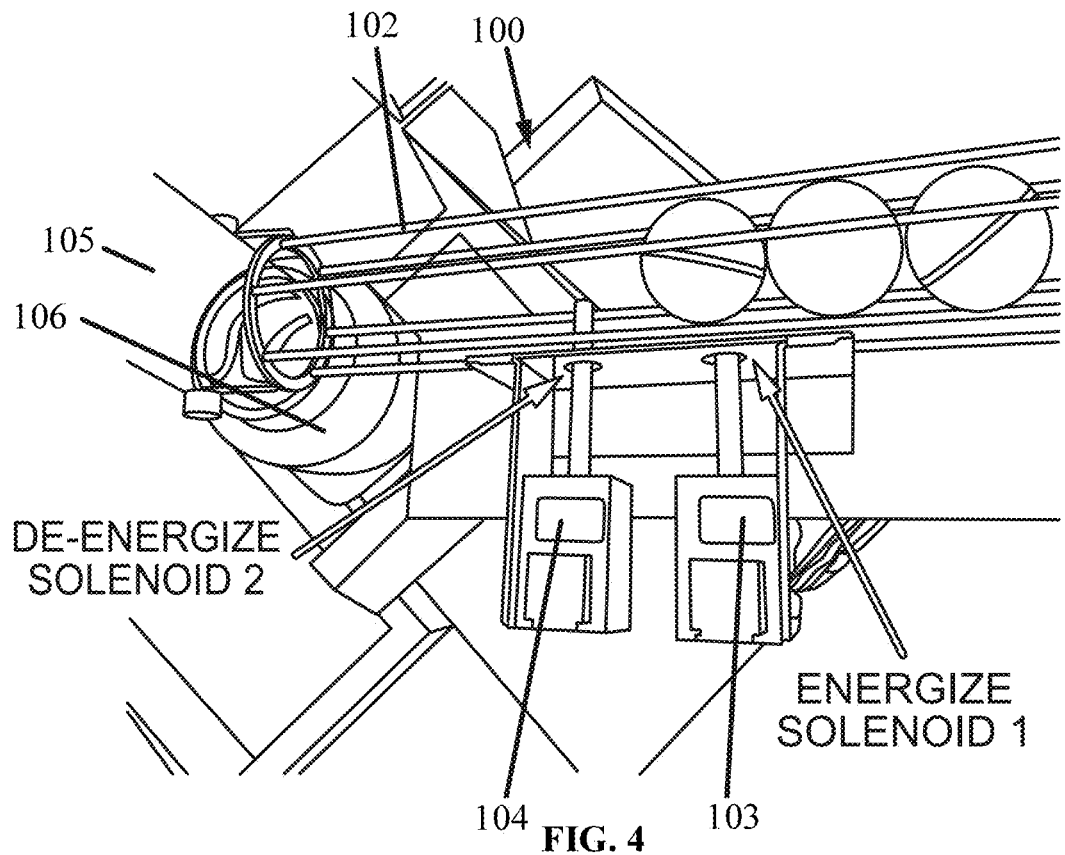
FIG. 4 is a top perspective view of the delivery system of FIG. 2.
Figure 5:
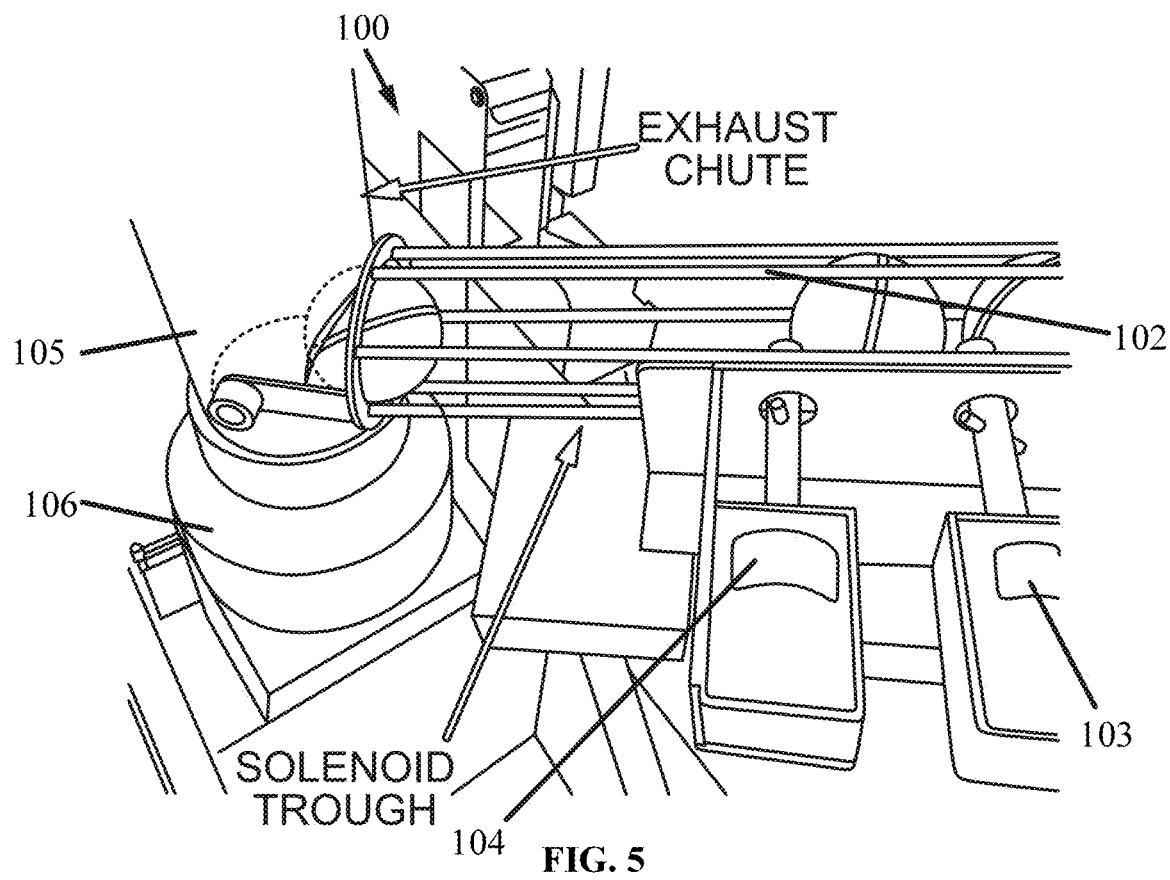
FIG. 5 is a front perspective view of the delivery system of FIG. 2.
Figure 6:
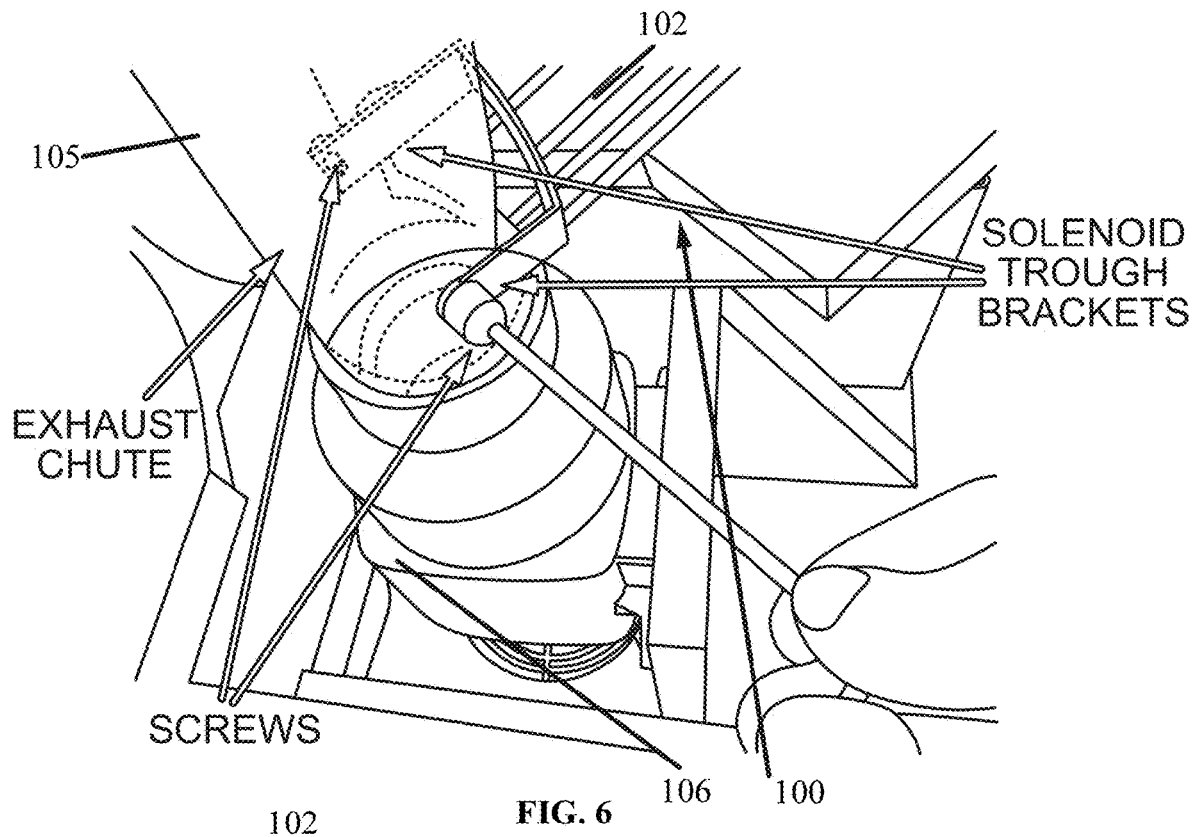
FIG. 6 is a left side perspective view of the delivery system of FIG. 2.

Delivery system 100 includes an inlet trough 101 and queue 109 connected to a blocker conduit 102. Inlet trough 101, queue 109 and blocker conduit 102 may be sloped to permit rolling objects to travel passively along inlet trough 101, queue 109 and blocker conduit 102 in response to a gravitational force. According to an embodiment, inlet trough 101, queue 109 and blocker conduit 102 are identically sloped so as to form a straight line between a distal end of inlet trough 101 and a distal end of blocker conduit 102. According to a further embodiment, as shown in FIGS. 1 and 2, inlet trough 101, queue 109 and blocker conduit 102 differ in slope, such that inlet trough 101, queue 109 and blocker conduit 102 meet at an angle. According to an embodiment as shown in FIGS. 1-12, one or both of inlet trough 101 and blocker conduit 102 have large perforations or openings to allow foreign matter and debris which may otherwise jam delivery system 100 to pass straight through inlet trough 101 and blocker conduit 102 and fall to a surface below, leaving delivery system 100 unobstructed and operational. Large perforations or wireframe in inlet trough 101 and blocker conduit 102 may facilitate monitoring a quantity of rolling objects loaded in delivery device 100, troubleshooting delivery system 100, and recognizing obstructions of delivery system 100. As shown in FIGS. 1-12, inlet trough 101 and blocker conduit 102 may be of a wire frame construction. Inlet trough 101, queue 109 and blocker conduit 102 may vary in size and may be configured to accommodate a variety of rolling objects. Inlet trough 101, queue 109 and blocker conduit 102 may be variable in length to accommodate various quantities of rolling objects. According to an embodiment, inlet trough 101, queue 109 and blocker conduit 102 are extendable to facilitate use in multiple gaming applications. In a further embodiment, a receiving end of inlet trough 101 is enlarged with a top opening to facilitate rolling object loading into inlet trough 101 from above. In yet another embodiment, as shown in FIGS. 1-12, inlet trough 101, queue 109 and blocker conduit 102 has a width just slightly larger than the diameter of a rolling object loaded into delivery system 100, such that a series of rolling objects may only enter queue 109 and blocker conduit 102 one by one. Queue 109 may be constructed of clear plastic or glass to permit real-time monitoring of a queue of rolling objects loaded into delivery system 100 and facilitate troubleshooting in the event of dysfunction of delivery system 100. This can also provide a sealed system for storing rolling objects when shipping delivery system 100. In other embodiments, inlet trough 101, queue 109 and blocker conduit 102 may be constructed of one or more of thermoplastic, metal, wood, glass or a combination of suitable materials. Durability, rigidity, material cost and ease of repair and replacement may be among considerations informing the choice of materials for inlet trough 101, queue 109 and blocker conduit 102.

According to an embodiment, inlet trough 101 may include an enclosed queue 109 that connects with an enclosed wire frame blocker conduit 102. The enclosed queue 109 can allow each rolling object from a perforated or wire-frame portion of inlet trough 101 to enter one by one, and the size of the enclosed piping system can be slightly larger than each rolling object. The enclosed queue 109 can be made out of plastic, glass, metal, wood, etc. Clear plastic or glass can allow one to visibly see the rolling objects in queue. The enclosed queue 109 can be constructed from piping. Metal or plastic clamps can be used to secure the piping. The enclosed queue 109 is angled to allow the rolling objects to roll downwards towards and enter the enclosed wire frame blocker conduit 102. A portion of inlet trough 101 leading to the enclosed queue 109 can have spaces that allow small debris to fall through, and this can help prevent the small debris from entering the enclosed queue 109. Rolling objects can travel from that portion of inlet trough 101 to the enclosed queue 109 and enclosed wire frame blocker conduit 102.

Figure 7:
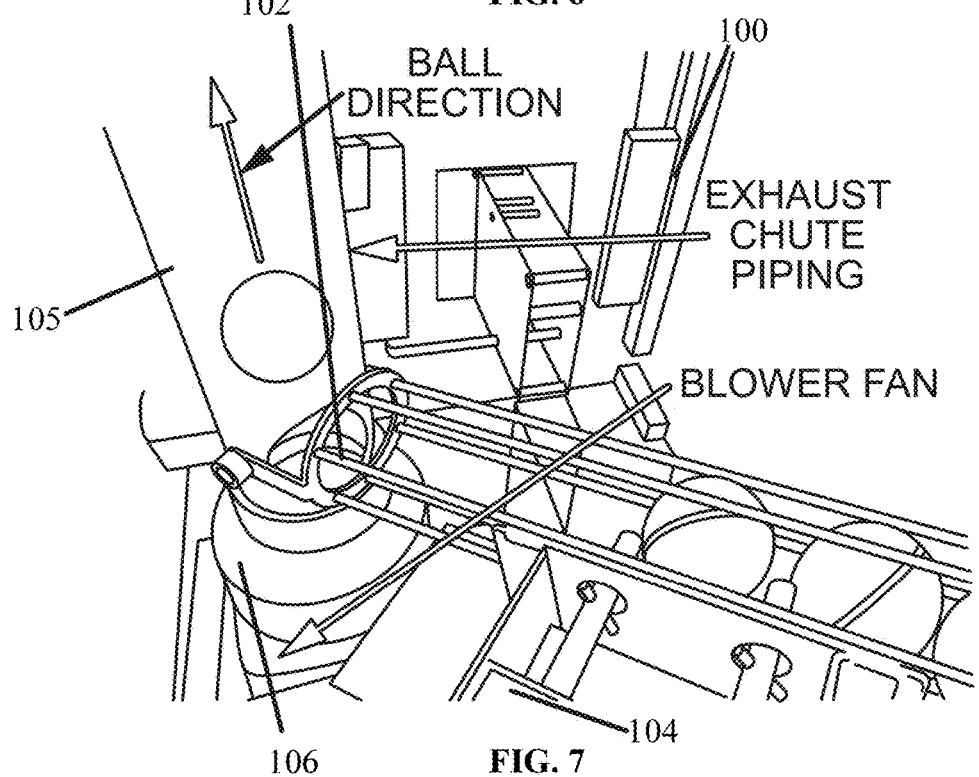
FIG. 7 is a front perspective view of the delivery system of FIG. 2.

Delivery system 100 also includes a first blocker 103 and a second blocker 104. First blocker 103 and second blocker 104 may include pneumatic or electric actuators, for example. According to an embodiment, first blocker 103 and second blocker 104 each include a blocker extension. As shown in FIGS. 1-5, 10 and 11, first blocker 103 and second blocker 104 may be disposed at a point along blocker conduit 102. First blocker 103 and second blocker 104 may be mounted directly onto blocker conduit 102. According to an embodiment, first blocker 103 and second blocker 104 are mounted to a stand immediately proximate blocker conduit 102, as shown in FIGS. 2-5. According to an embodiment, as shown in FIGS. 1, 2, and 7, an extension (e.g., plunger) of each of first blocker 103 and second blocker 104 is disposed into and extends across blocker conduit 102 (e.g., at a base). According to a further embodiment, first blocker 103 and second blocker 104 are separated by a distance corresponding to a length of a rolling object (e.g., diameter of a ball) for use with delivery system 100, such that only a single rolling object may occupy a space in blocker conduit 102 between the extension of first blocker 103 and the plunger of second blocker 104, as shown in FIGS. 1, 2, 5, 7 and 10. The space between the plungers must be enough to trap only one rolling object. The extensions can be long enough when extended to prevent a rolling object from moving past and through the blocker conduit 102. The extensions can be cylindrical. Springs on the blockers can be strong enough to release the extension once the blocker is not powered.

A blocker is actuated by an electrical signal or command, according to some embodiments. The electrical signal or command can allow a blocker to impede a rolling object from movement through blocker conduit 102 and/or allow a rolling object to move through blocker conduit 102 past the blocker. In some embodiments, a blocker can be a solenoid, and an extension of a blocker can be an arm (e.g., a plunger). In some embodiments, a blocker can include a motor having a rotatable disc connected to a triangular-shaped end. The motor is configured to actuate rotation of the disc, which, upon rotation, rotates the triangular-shaped end, which, upon rotation, allows a rolling object to pass by the triangular-shaped end through the blocker conduit 102. This can allow for controlled passage of the rolling object through at least a portion of the blocker conduit 102, for example. The motor can be a 12 volt DC motor, for example. As an example, the motor can actuate a quarter turn to allow the rolling object to pass by. In some embodiments, a blocker is a blocker unit for controlling when a rolling object can pass by the blocker through the blocker conduit 102, where the blocker unit is coupled to a motor. In some embodiments, the blocker is a pneumatic cylinder that can actuate a plunger extending into and retracting from the blocker conduit 102. In some embodiments, a blocker uses an electrical mechanism for controlling rolling object movement through blocker conduit 102. In some embodiments, a blocker includes a motor. In some embodiments, a blocker includes a solenoid. Other embodiments of blocker are possible.

Delivery system 100 also includes an exhaust conduit 105. In some embodiments, exhaust conduit 105 is oriented vertically relative to a surface on which delivery system 100 is set, as shown in FIGS. 1 and 5-12. According to an embodiment, exhaust conduit 105 varies in height. According to a further embodiment, exhaust conduit 105 is collapsible or may be variably extended to adapt to different gaming applications. Blocker conduit 102 may feed into exhaust conduit 105 at a point above a force generator 106. According to an embodiment, blocker conduit 102 is secured to exhaust conduit 105 to ensure proper alignment of an open end of blocker conduit 102 with an aperture in a side wall of exhaust conduit 105 to provide an unimpeded passage of one or more rolling objects from blocker conduit 102 to exhaust conduit 105. Blocker conduit 102 may include brackets, the brackets secured to an outer wall of exhaust conduit 105 via screws, bolts or other securing means, as shown in FIGS. 4-7.

Delivery system 100 further includes a force generator 106. Force generator 106 is connected to exhaust conduit 105 at a point below blocker conduit 102. According to an embodiment, as shown in FIGS. 1-12, force generator 106 is connected to a bottommost receiving end of exhaust conduit 105. Force generator 106 may be, for example, a radial, forward curve, backward curve or air foil fan. In some embodiments, blower 106 is of a design that will not create tornado type turbulence to cause the rolling object to spin onto the floor during levitation. Force generator 106 may vary in horsepower according to the type, and particularly, the size and weight of a rolling object used with delivery system 100. The choice of force generator 106 may be informed by factors including cost and ease of repair, reliability, durability and power.

According to an embodiment, in the event that a spilled beverage or other fluid enters exhaust conduit 105, force generator 106 can blow some of the spilled beverage up and out of exhaust conduit 105 while the remaining spilled beverage passes through the air inlet of force generator 106 thereby exiting delivery system 100. The air inlet of force generator 106 may be uncovered or may be covered by a bottom motor cover, such as a wire frame grill or perforated plastic cap. According to an embodiment, force generator 106 further comprises a bottom motor cover, such as a finger safe motor grill cover, as shown near the force generator 106 inlet floor opening in FIG. 12. The bottom motor cover may be configured to permit the movement of air up exhaust conduit 105 while protecting the motor from contact (e.g., by fingers) under the motor. The bottom motor cover may also protect the motor against the accidental spillage of soft drinks rested near a game during game play by allowing fluids to pass through the motor. In some embodiments, bottom motor cover is mounted to a portion of ground beneath force generator 106. In some embodiments, bottom motor cover is integral with the force generator 106.

Figure 13:
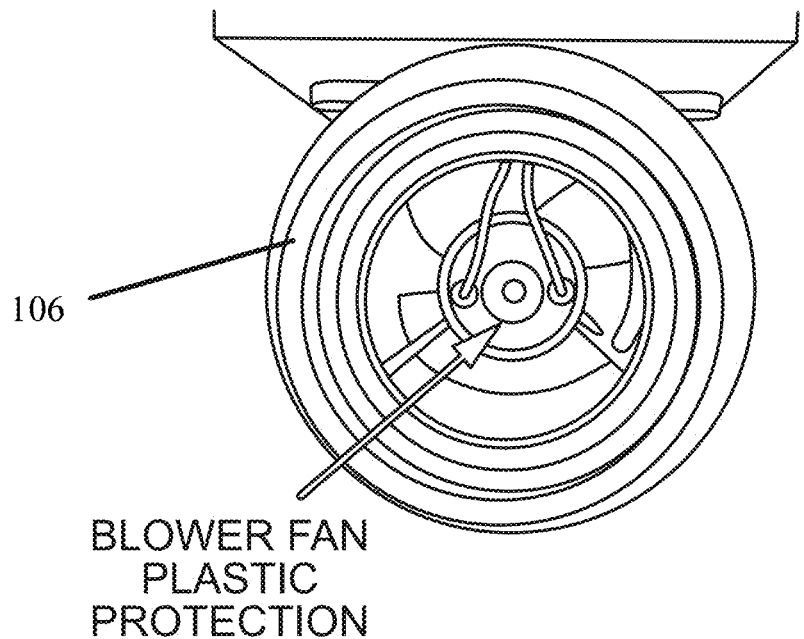
FIG. 13 is a top view of the delivery system of FIG. 2.

In some embodiments, a top motor cover, such as a splash proof motor cover, is positioned near a motor of force generator 106. This top motor cover can be moulded around the motor inside force generator 106, for example. This can protect the motor from spills or debris. An example top motor cover is shown in FIG. 13 as a plastic protection for a blower fan. The top motor cover can comprise a plastic splash-proof motor cover which may, in conjunction with the air inlet prevent such debris/foreign matter from inhibiting the operation of the motor. According to an embodiment, the top motor motor cover is just large enough to cover and shield the motor while otherwise leaving force generator 106 unencumbered. According to an embodiment, in the event of an obstruction of exhaust conduit 105, air from force generator 106 may dissipate through a perforated wall of blocker conduit 102 such that there is insufficient force to propel one or more rolling objects backward through blocker conduit 102 and into or out of inlet trough 101. Blocker conduit 102 can be enclosed (e.g., offer a 360 degree perimeter) and comprised of a wire frame, and blocker conduit can be long enough to allow enough air to escape if the exit of the exhaust conduit is covered while not having any openings that would allow a rolling object to escape.

In some embodiments, a force generator cover, such as a screen, is positioned above force generator 106 and can impede objects from reaching force generator 106 through exhaust conduit 105. An example force generator cover is shown in FIG. 19. Other sizes and shapes can be selected for compatibility with the size and shape of force generator 106. FIG. 20 shows an example force generator cover installed at a force generator 106, according to some embodiments. A force generator cover can be positioned above the top of force generator 106 and can help prevent large debris from reaching force generator 106, such as if dropped through a top opening of exhaust conduit 105, while permitting force, such as applied by air from force generator 106, to be applied through the force generator cover without causing turbulence (e.g., air turbulence) due to movement of air around the force generator cover.

Figure 8:
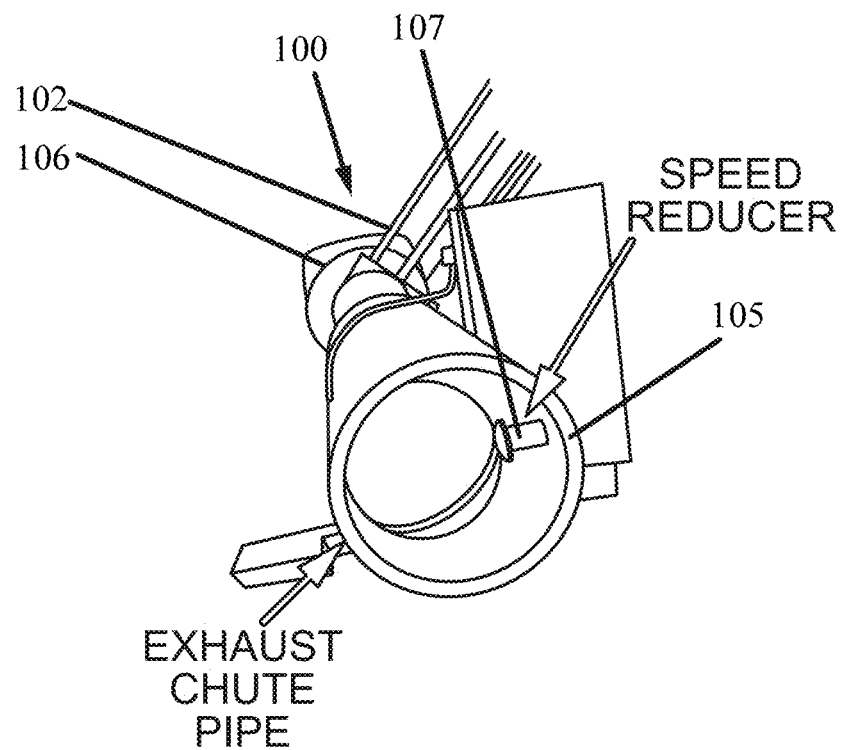
FIG. 8 is a top perspective view of the delivery system of FIG. 2.
Figure 9:
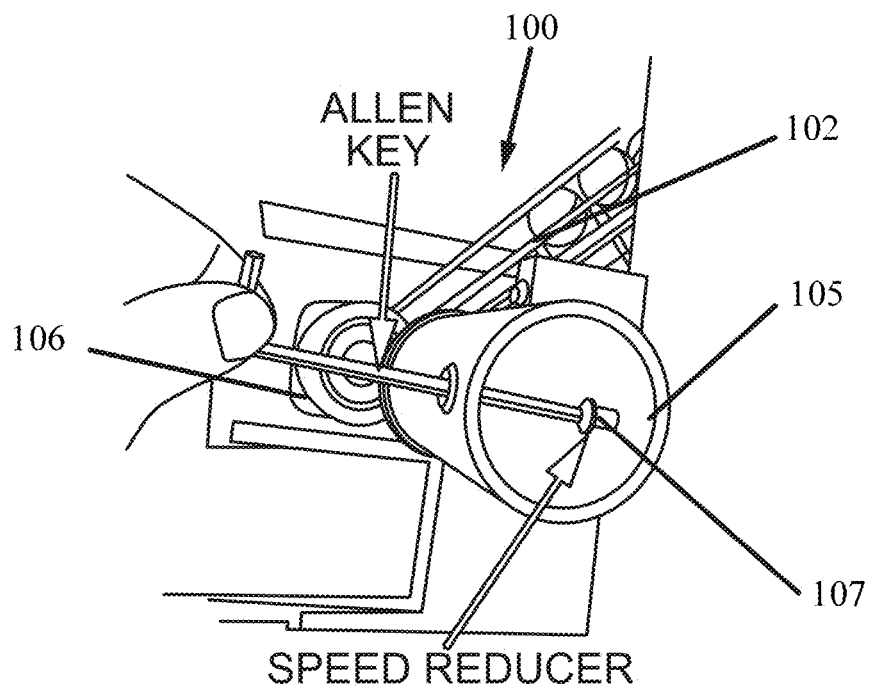
FIG. 9 is a top perspective view of the delivery system of FIG. 2.
Figure 10:
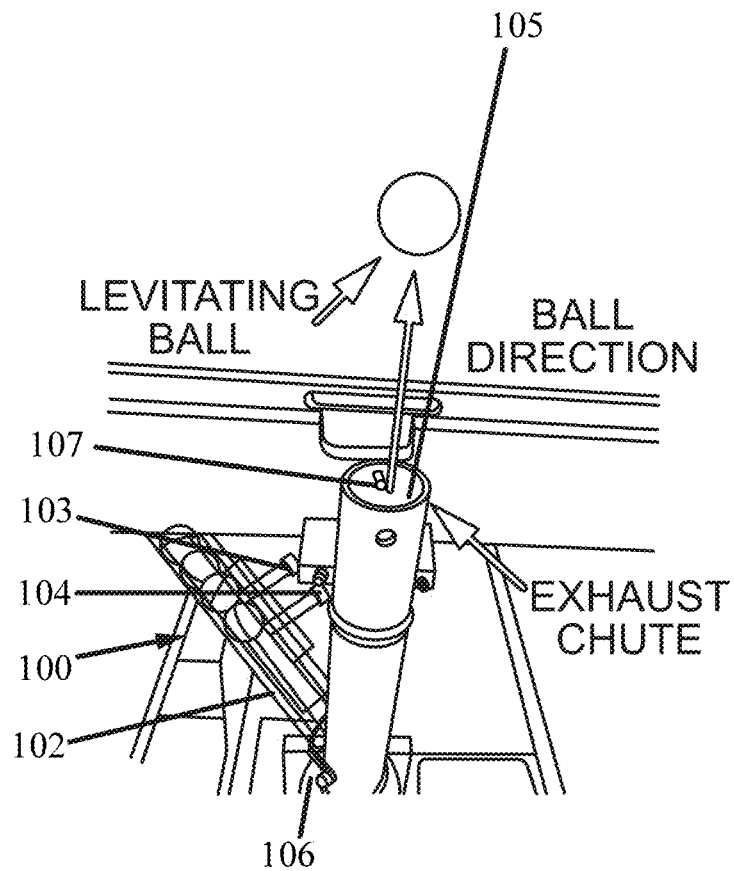
FIG. 10 is a rear side perspective view of the delivery system of FIG. 2.
Figure 11:
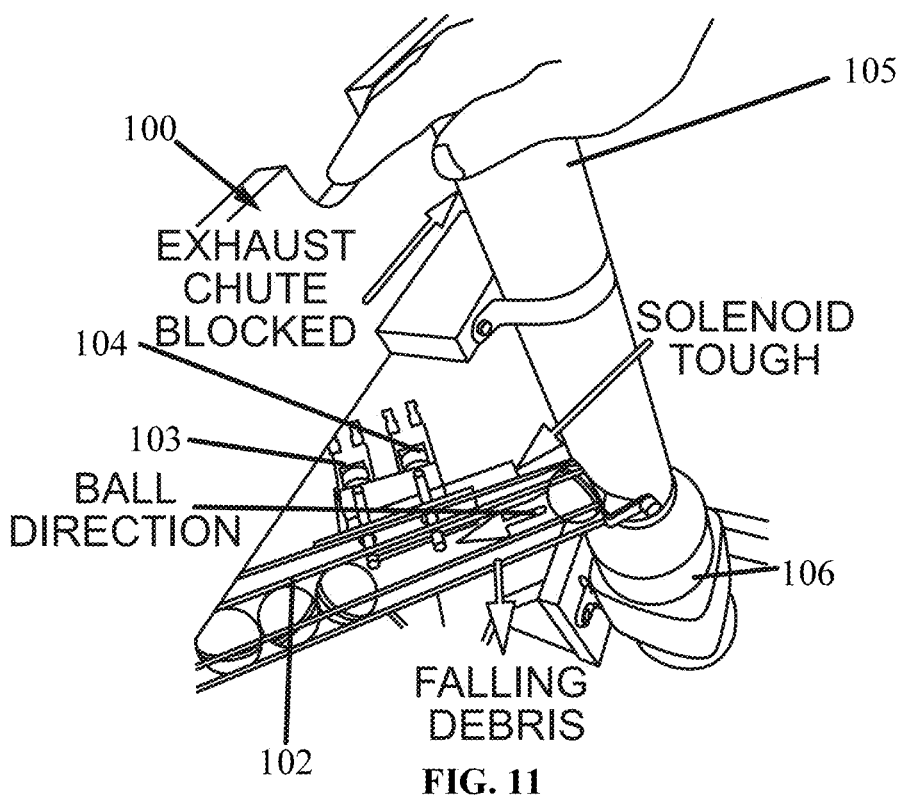
FIG. 11 is a rear perspective view of the delivery system of FIG. 2.
Figure 12:
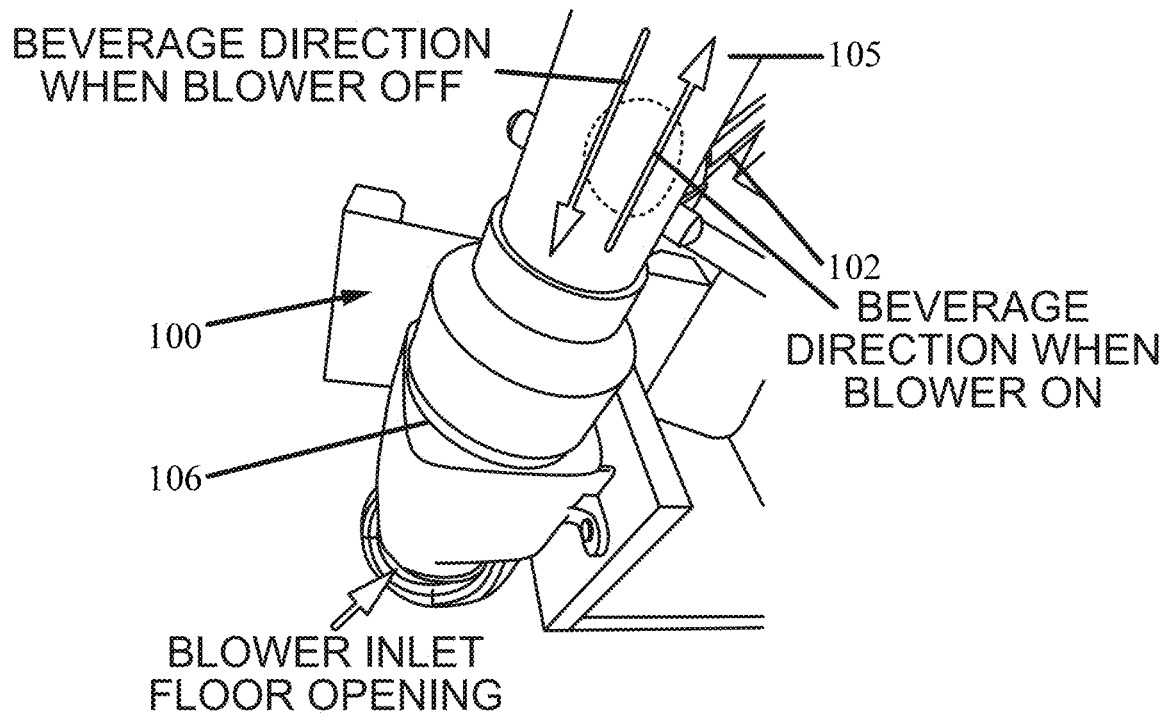
FIG. 12 is a left side perspective view of the delivery system of FIG. 2.

In some embodiments, delivery system 100 further includes a speed reducer 107. Speed reducer 107 is disposed at a point along exhaust conduit 105. According to an embodiment, speed reducer 107 is disposed at a topmost delivery end of exhaust conduit 105. Speed reducer 107 may consist of a round-head screw threaded into the inside wall of exhaust conduit 105, as shown in FIGS. 8 and 9. Size, material type, a frictional coefficient between speed reducer 107 and a rolling object exiting exhaust conduit 105, and adjustability may be considerations informing the choice of a suitable speed reducer 107. According to an embodiment, an aperture in exhaust conduit 105, immediately opposite speed reducer 107, as shown in FIG. 9, permits fine tuning of the degree to which speed reducer 107 extends into exhaust conduit 105 and therefore the degree to which a rolling object's speed is reduced as it exits exhaust conduit 105. According to an embodiment wherein speed reducer 107 is a round-head screw, speed reducer 107 can be adjusted using an Allen key. Speed reducer 107 will slow a rolling object exiting exhaust conduit 105 enough to enable the rolling object to levitate (suspend) proximate a topmost end of exhaust conduit 105 for so long as force generator 106 is running. Friction between speed reducer 107 and a rolling object exiting exhaust conduit 105 will reduce the rolling object's speed. Speed reducer 107 can be long enough to cause the rolling object to rub against it and the inner wall of the exhaust conduit piping. Speed reducer 107 eliminates the need for controlling the speed of the force generator which reduces cost. A third blocker could also be used as a speed reducer but may add cost.

Delivery system 100 further includes a microprocessor 108, wherein microprocessor 108 is connected to and controls first blocker 103 and second blocker 104. With one or more rolling objects loaded into blocker conduit 102, microprocessor 108 may energize and de-energize first blocker 103 to queue a first rolling object in the space between the plunger of first blocker 103 and the plunger of second blocker 104. Microprocessor 108 may then energize and de-energize second blocker 104 to release the first rolling object into exhaust conduit 105. After de-energizing second blocker 104, microprocessor 108 may again energize and de-energize first blocker 103 to queue a second rolling object, if a second rolling object is loaded into blocker conduit 102.

Delivery system 100 also includes a power supply. The power supply may comprise, for example, an AC adapter. Other power supplies may be used with delivery device 100. Electrical efficiency, footprint, and capacity for wireless power delivery may be among considerations informing the choice of power supply for delivery system 100.

According to an embodiment, there is provided a method of delivering and levitating a rolling object, comprising: loading at least one rolling object into an inlet trough; powering on a force generator; energizing a first blocker; de-energizing the first blocker; and energizing a second blocker. The rolling object rolls down the inlet trough and into a blocker conduit where it is stopped by a plunger of the first blocker. Energizing the first blocker causes the plunger to retract, permitting the rolling object to continue along the blocker conduit until stopped by a plunger of the second blocker. Once the rolling object travels past the first blocker, the first blocker is de-energized to re-extend the plunger thereby trapping the rolling object between the plunger of the first blocker and the plunger of the second blocker. Energizing the second blocker causes the plunger to retract, permitting the rolling object to continue along the blocker conduit and into an exhaust conduit with which it is connected. The energizing and de-energizing of the first and the second blockers are controlled by a microprocessor. The exhaust conduit is further connected to a force generator. Powering on the force generator sends a continuous stream of air up the exhaust conduit. On entering the exhaust conduit, the rolling object is propelled upwards out of the exhaust conduit by the stream of air produced by the force generator. A speed reducer in the exhaust conduit causes a reduction in the rolling object's speed before the rolling object exits the exhaust conduit, such that the rolling object hovers/levitates immediately above a topmost end of the exhaust conduit as long as the force generator is powered on, rather than being launched out of and away from the exhaust conduit. Gravity facilitates the rolling object moving through each component of delivery system 100 by causing the rolling object to roll downwards. In some embodiments, this rolling object is a ball.

According to an embodiment, the shape of piping and troughs can be triangular, circular, or similar, permitting a rolling object to travel downwards and/or through as described. The piping and troughs can be just slightly larger than the rolling object so as to not allow two rolling objects to jam the device by being positioned side by side. The components can be used with items other than circular balls, and the components can be shaped to accommodate same.

In some embodiments, a system for delivering a levitating rolling object (an example of which is shown in FIG. 14) includes the delivery system 100 described herein and a surface angled downwards towards the inlet trough 101 and positioned near a rear wall. For example, the surface can be flat and angled to direct a rolling object landing on the surface towards a receiver (e.g., a trough or pipe) that connects with the inlet trough 101 or, in some embodiments, the rolling object is directed towards the inlet trough 101 directly. The inlet trough can have an open top half, such that a rolling object can land anywhere at various points along the inlet trough and travel in the inlet trough 101 towards queue 109.

One or more receivers can be included in a system using the delivery system 100. One or more receivers are positioned on the surface and sized and dimensioned to receive at least one rolling object. A receiver can receive a rolling object through a top opening. A receiver can be a cup (with bottom openings that allow passage of a rolling object), for example. A receiver can be a basketball net, for example. A receiver has an opening at a top end for receiving a rolling object and an opening at a bottom end for allowing a rolling object to exit the receiver, in some embodiments. At least one of the receiver(s) has a post extending upwards therethrough near an interior surface of the receiver, the interior surface excluding a rear interior surface. For example, the post can be a thin finger that is positioned near an interior wall of the receiver. The post can be attached to the surface and the receiver can be placed over the post, such that the post extends therethrough. The receiver can accordingly have an opening at a base portion to receive the post. When a rolling object is received into the receiver (e.g., thrown), a post extending in the receiver can reduce or stop any time spent by the rolling object spinning in the receiver. The rolling object can hit the post and then drop to the bottom of the receiver. In some embodiments, the post can be positioned along an interior wall of the receiver, except at a portion facing the direction that the rolling object is expected to be projected from. This can help prevent the rolling object from hitting the post until it enters the receiver. This can help minimize any slowdown in a game that may be caused by the rolling object spinning in the receiver, such as can occur for up to five seconds or longer. For example, if a rolling object is thrown by a player towards the receiver from a position in front of the receiver, the post can be positioned such that it is not near an interior rear wall of the receiver. Players may not have to wait for as long every time they throw a rolling object into a receiver, for example. In some embodiments, one or more sensors are connected to each of one or more receivers. A sensor can detect passage of a rolling object into or through the receiver and/or timing of same, depending on configuration, for example. Data from the sensor(s) can be used to update a score board via a controller, for example.

In some embodiments, the system for delivering a levitating rolling object also includes at least one rear post, each rear post positioned on the surface and extending upwards near the rear wall and between a space defined by the rear wall and adjacent receivers (e.g., where there are at least two receivers). The rear post(s) are taller than post(s) extending through an interior of a receiver, according to some embodiments. The rear post(s) can help stop a rolling object from becoming lodged between adjacent receivers and the rear wall, according to some embodiments. FIGS. 15, 16, 17, and 18 show posts extending through a receiver and/or rear posts, according to some embodiments.

In some embodiments, there is provided a method for levitating a rolling object, including: retaining at least one rolling object; blowing a gas upwards to create an upwards force sufficient to levitate each rolling object separately; and separately delivering levitating each rolling object using the force. In some embodiments, the force is generated using air that supports the rolling object, and the force provides support to the rolling object upwards and to the side of the rolling object, such as in a wave pattern. The force can contact the rolling object and loop back, and the force can help prevent the rolling object from moving an impermissible distance to the left, right, forwards, or backwards. This can allow the rolling object to levitate approximately in position, for example.

Figure 21:
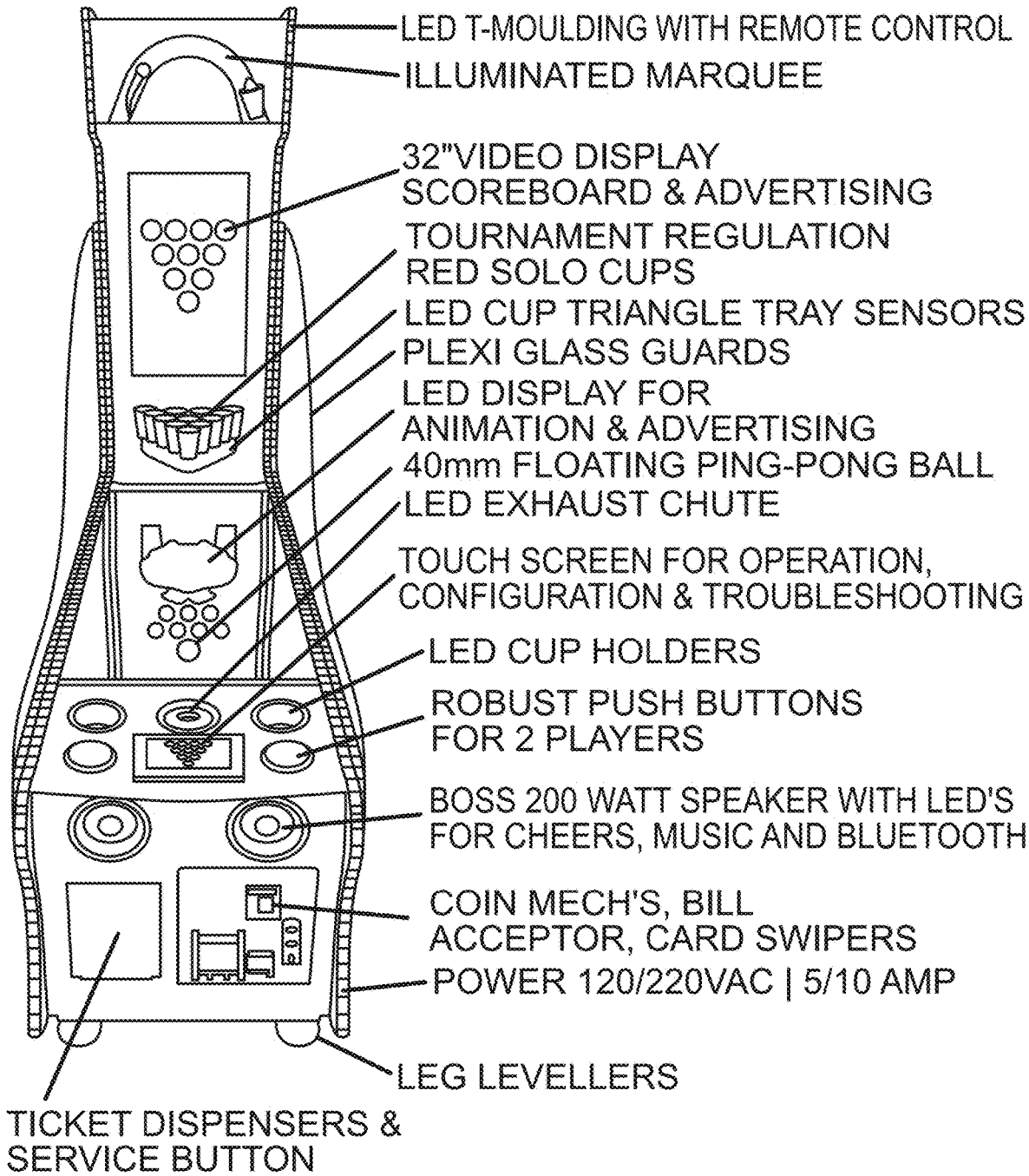
FIG. 21 is a front view of a gaming device.
Figure 22:
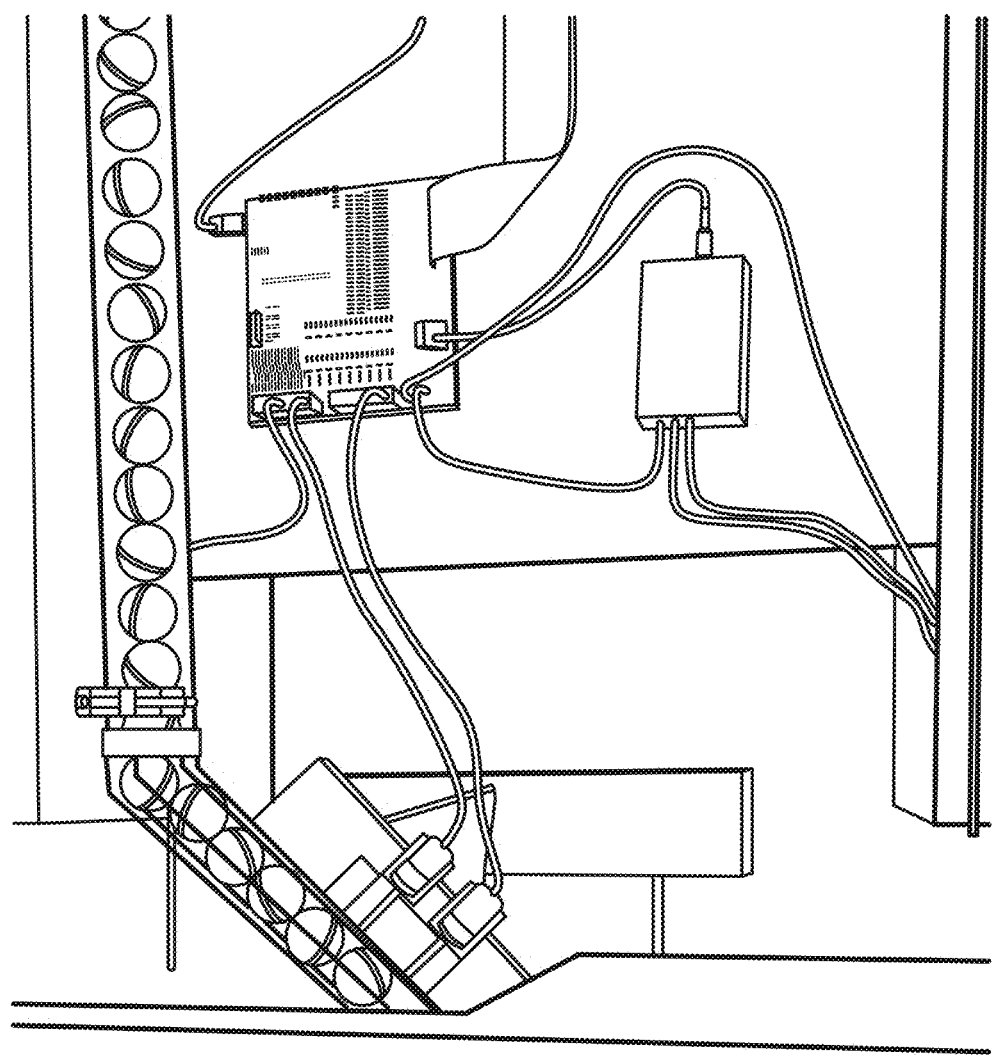
FIG. 22 is a top view of a gaming device.
Figure 22:
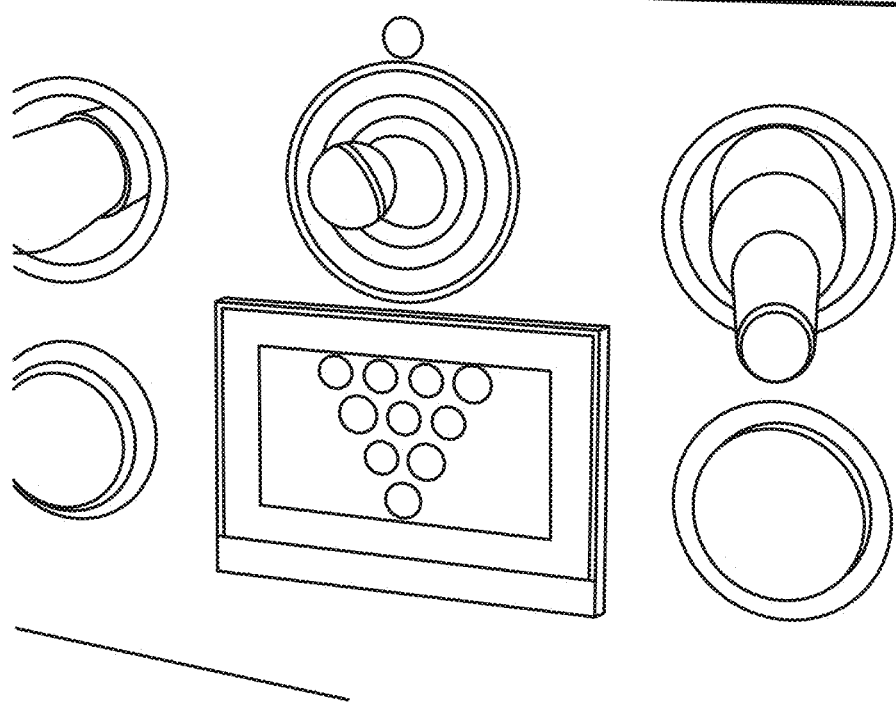
Figure 23:
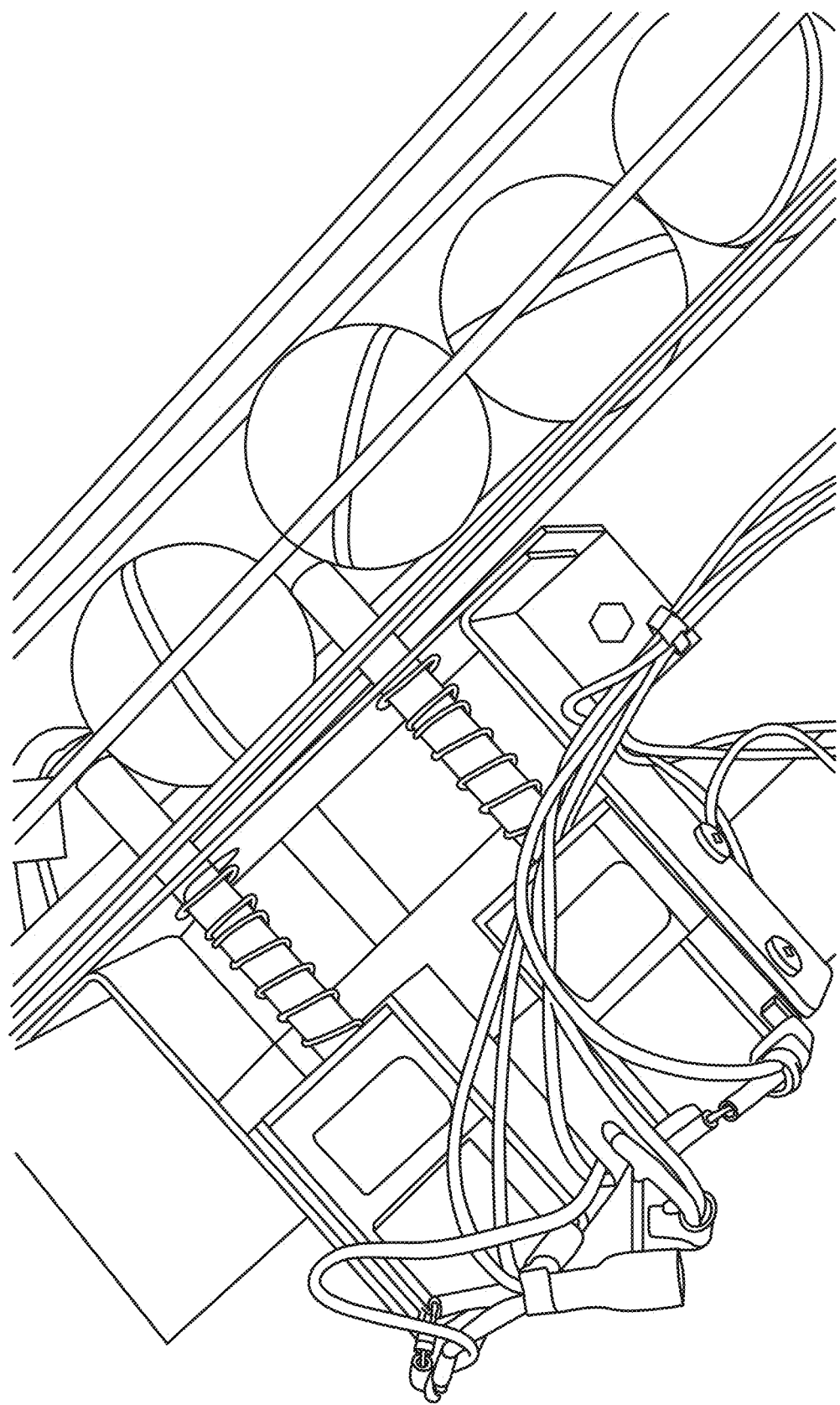
FIG. 23 is a perspective view of a blocker conduit.

FIG. 21 shows an example gaming system including delivery system 100, according to some embodiments. Upon press of a button, delivery system 100 is actuated and delivers a rolling object through exhaust conduit 105 such that the rolling object levitates above an exhaust conduit exit opening of exhaust conduit 105. Music, animation, score board updates, tracking of which receiver(s) have received a rolling object during a game, and/or other events can be actuated upon interaction with the gaming device, such as when the rolling object is received in a receiver having an associated sensor for detection of the rolling object. The gaming device can track players, points, and games and configure a screen to report same. Dual redundant sensors and LEDs can be included at a receiver (e.g., on each cup). Various components can be illuminated. A touch screen for game configuration and display of score status can be included. Processor status indicators can be included at a processor of the gaming device for troubleshooting. Leg levelers can be included to help facilitate delivery of the rolling object from a surface of the gaming device to an inlet trough 101. A micro-SD card, Bluetooth connectivity, USB sticks for storing advertisements, rear access doors and other doors to facilitate servicing, coin and ticket receivers and dispensers, a shot clock, and/or any combination of same can be included in the gaming system, according to some embodiments. FIG. 22 shows an example gaming system including delivery system 100, according to some embodiments. As shown, a gaming surface has been removed to allow depiction of components of delivery system 100. FIG. 23 shows an example blocker conduit 102, according to some embodiments.

In some embodiments, there is provided a delivery system, comprising: an inlet trough, queue and a blocker conduit; a first and a second blocker; a force generator; an exhaust conduit; a speed reducer; a microprocessor, wherein the microprocessor is connected to the first blocker and the second blocker; and a power supply.

In some embodiments, there is provided a method of delivering and levitating a ball, comprising: loading at least one ball into a blocker conduit; energizing a first blocker; de-energizing the first blocker; and energizing and de-energizing a second blocker; powering on a force generator connected to an exhaust conduit that includes a speed reducer.

Various embodiments have been described in detail. Changes in and or additions to the above-described embodiments may be appreciated.

What is claimed is:

1. A delivery system for levitation, comprising:
    an inlet trough having an inlet receiver opening and an inlet exit opening, the inlet trough angled at a decline;
    a queue having a queue receiver opening aligned with the inlet exit opening, the queue angled at a decline;
    a blocker conduit having a blocker conduit receiver opening aligned with a queue exit opening of the queue, the blocker conduit comprising a wire frame, the blocker conduit angled at a decline;
    a first blocker and a second blocker, each having an extension through the blocker conduit for selectively permitting passage through the blocker conduit, the extension of the first blocker spaced laterally along the blocker conduit from the extension of the second blocker;
    an exhaust conduit having an exhaust conduit receiver opening between a base end of the exhaust conduit and an exhaust conduit exit opening of the exhaust conduit, the exhaust conduit receiver opening aligned with a blocker conduit exit opening of the blocker conduit; and
    a force generator positioned near the base end and below the exhaust conduit receiver opening.

2. The delivery system of claim 1, wherein the inlet trough is comprised of a wire frame.

3. The delivery system of claim 1, wherein the inlet trough is configured to allow debris to pass through transversely to an axis defined by the length of the inlet trough.

4. The delivery system of claim 1, wherein the queue comprises an enclosed pipe.

5. The delivery system of claim 1, wherein the queue comprises material that is not opaque.

6. The delivery system of claim 1, wherein the queue is angled downwards.

7. The delivery system of claim 1, wherein the queue receiver opening is sized and dimensioned to receive no more than one rolling object simultaneously.

8. The delivery system of claim 1, wherein the blocker conduit is configured to allow debris to pass through transversely to an axis defined by the length of the blocker conduit.

9. The delivery system of claim 1, wherein the first blocker and the second blocker each extend transversely through the blocker conduit.

10. The delivery system of claim 1, further comprising a microprocessor configured to temporarily retract the extension of the first blocker to allow a rolling object in the blocker conduit to enter a space between the extension of the first blocker and the extension of the second blocker and be retained therebetween.

11. The delivery system of claim 10, the microprocessor configured to temporarily retract the extension of the second blocker to allow the rolling object to exit the space between the extension of the first blocker and the extension of the second blocker.

12. The delivery system of claim 1, wherein the distance between the extension of the first blocker and the extension of the second blocker is a diameter of each rolling object in the blocker conduit.

13. The delivery system of claim 1, wherein the distance between the extension of the first blocker and the extension of the second blocker is configured to allow no more than one rolling object therebetween simultaneously.

14. The delivery system of claim 1, wherein the force generator is configured to direct force through the exhaust conduit from the base end towards the exhaust conduit exit opening.

15. The delivery system of claim 1, further comprising a speed reducer attachable to the exhaust conduit near the exhaust conduit exit opening.

16. The delivery system of claim 15, the speed reducer extending through the exhaust conduit at a distance configured for frictional contact with an object moving past the speed reducer through the exhaust conduit, the frictional contact reducing the speed of the rolling object to allow it to be supported by a force maintainable by the force generator above the exhaust conduit.

17. The delivery system of claim 1, wherein the base end is an opening.

18. The delivery system of claim 1, wherein the force generator further comprises a protective cover.

19. A system for delivering a levitating ball, comprising:
the delivery system of claim 1;
a surface angled downwards towards the inlet trough and positioned near a rear wall;
one or more receivers positioned on the surface and sized and dimensioned to receive at least one ball; and
at least one of the one or more receivers having a post extending upwards through the receiver near an interior surface of the receiver that is not a rear portion of the interior surface.

20. The system of claim 19, further comprising:
at least two receivers; and
at least one rear post, each rear post positioned on the surface and extending upwards near the rear wall and between a space defined by the rear wall and adjacent receivers of the at least two receivers.

* * * * *